United States Patent
Alderson et al.

(10) Patent No.: US 6,901,173 B2
(45) Date of Patent: May 31, 2005

(54) SCENE-BASED NON-UNIFORMITY CORRECTION FOR DETECTOR ARRAYS

(75) Inventors: Timothy Alderson, Winter Spring, FL (US); Gene D. Tener, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 538 days.

(21) Appl. No.: 09/840,920

(22) Filed: Apr. 25, 2001

(65) Prior Publication Data

US 2002/0159101 A1 Oct. 31, 2002

(51) Int. Cl.⁷ ................................................ G06K 9/20
(52) U.S. Cl. ...................................... 382/312; 382/255
(58) Field of Search ................................ 382/284, 255, 382/260, 263, 275, 274, 312; 348/164, 229.1, 345, 349; 250/208.1, 330, 332, 334, 347, 252.1; 356/51

(56) References Cited

U.S. PATENT DOCUMENTS

| | | |
|---|---|---|
| 5,341,442 A | 8/1994 | Barrett |
| 5,382,977 A | 1/1995 | Kozlowski et al. |
| 5,391,873 A | 2/1995 | Cuthbertson |
| 5,446,378 A | 8/1995 | Reich et al. |
| 5,455,622 A | 10/1995 | Compton |
| 5,563,405 A | 10/1996 | Woolaway, II et al. |
| 5,589,928 A | 12/1996 | Babbitt et al. |
| 5,604,346 A | 2/1997 | Hamrelius et al. |
| 5,629,988 A | 5/1997 | Burt et al. |
| 5,631,466 A | 5/1997 | Botti et al. |
| 5,648,649 A | 7/1997 | Bridgelall et al. |
| 5,657,402 A | 8/1997 | Bender et al. |
| 5,693,940 A | 12/1997 | Botti et al. |
| 5,717,208 A | 2/1998 | Woolaway, II |
| 5,721,427 A | 2/1998 | White et al. |
| 5,801,678 A | 9/1998 | Huang et al. |
| 5,872,628 A | 2/1999 | Erskine |
| 5,903,659 A | 5/1999 | Kilgore |
| 5,925,875 A | 7/1999 | Frey |
| 5,925,880 A | 7/1999 | Young et al. |
| 5,925,883 A | 7/1999 | Woolaway, II |
| 5,949,919 A | 9/1999 | Chen |
| 5,963,675 A | 10/1999 | van der Wal et al. |
| 6,011,625 A | 1/2000 | Glass |
| 6,018,162 A | 1/2000 | Herbst et al. |
| 6,020,842 A | 2/2000 | Lewis et al. |
| 6,040,568 A | 3/2000 | Caulfield et al. |
| 6,040,570 A | 3/2000 | Levine et al. |
| 6,046,695 A | 4/2000 | Poehler et al. |
| 6,047,028 A | 4/2000 | Van Ackere et al. |
| 6,198,768 B1 | 3/2001 | Yamaguchi et al. |
| 6,205,259 B1 | 3/2001 | Komiya et al. |
| 6,269,175 B1 | 7/2001 | Hanna et al. |
| 6,269,195 B1 | 7/2001 | Gonsalves et al. |
| 6,336,082 B1 | 1/2002 | Nguyen et al. |

(Continued)

FOREIGN PATENT DOCUMENTS

| | | | |
|---|---|---|---|
| EP | 0 653 882 A1 | 5/1995 | |
| EP | 0 830 013 A2 | 3/1998 | |
| WO | WO 97/01926 | * 1/1997 | ............ H04N/5/33 |

*Primary Examiner*—Yon J. Couso
(74) *Attorney, Agent, or Firm*—Burns, Doane, Swecker & Mathis, L.L.P.

(57) ABSTRACT

A method and apparatus for providing corrected values of gain and level coefficients of a set of correction coefficients for a scanning detector array, such as an IR detector array, comprising a plurality of detector channels is described. First values of the gain and level coefficients can be modified using at least one frame of image data collected by the scanning detector array from out-of-focus multiple-temperature imagery. Updated values of the gain and level coefficients can be determined using a scene-based non-uniformity correction (SBNUC) routine applied to scene data corresponding to focused scene imagery. The SBNUC routine can be applied iteratively such that updated values of gain and level coefficients converge to stable values.

75 Claims, 15 Drawing Sheets

U.S. PATENT DOCUMENTS

| | | |
|---|---|---|
| 6,359,681 B1 | 3/2002 | Housand et al. |
| 6,477,279 B2 | 11/2002 | Go |
| 6,556,704 B1 | 4/2003 | Chen |
| 6,656,704 B1 | 4/2003 | Chen |
| 6,630,674 B2 * | 10/2003 | Knauth et al. .............. 250/352 |
| 6,654,504 B2 | 11/2003 | Lubin et al. |
| 2002/0159648 A1 | 10/2002 | Alderson et al. |
| 2002/0159651 A1 | 10/2002 | Tener et al. |

* cited by examiner

FIG. 12 Original Image

FIG. 13 HP of Original Image

FIG. 14 Thresholded Image

SCENE-BASED NON-UNIFORMITY CORRECTION FOR DETECTOR ARRAYS

CROSS REFERENCE TO RELATED APPLICATIONS

The present application is related to U.S. patent application Ser. No. 09/841,079 "Extended Range Image Processing For Electro-Optical Systems", and to U.S. patent application Ser. No. 09/841,081 "Dynamic Range Compression", both filed even date herewith, the disclosures of which are incorporated herein by reference in their entirety.

BACKGROUND

1. Field of the Invention

The present invention relates to non-uniformity correction of imagery collected by detector arrays. More particularly, the present invention relates to scene-base non-uniformity correction of imagery collected by scanning detector arrays.

2. Background Information

Imagery collected using infrared detectors (or sensors) must undergo non-uniformity correction (NUC) to remove fixed pattern noise (FPN) due to variations in pixel responsivity (gain) and pixel offset (level) of the detector. A standard technique for correcting FPN is by generating correction coefficients comprising gain and level terms for each detector element of a detector array based on a linear calibration using thermal reference (calibration) sources of known temperatures. This type of correction can remove FPN over a specific temperature range for a given period of time. However, this type of correction requires recalibration of the gain and level terms due to drift of the detector and changes in scene temperature. Such recalibration can be costly and time consuming.

To address these shortcomings, scene-based non-uniformity correction (SBNUC) techniques have emerged. Conventional SBNUC techniques may utilize repeated blurring of imagery collected from the scene. In this approach, the non-uniformity correction is based upon processing out-of-focus imagery to avoid memorization of high-frequency scene content by the non-uniformity correction routine. This approach, however, can interfere with an operator's (e.g., a pilot's) ability to consistently view a focused image of the scene.

Conventional SBNUC techniques may also utilize motion of the scene relative to the detector to distinguish FPN from details of the scene image. Because FPN remains in the same detector location while the scene moves, the FPN can be distinguishable from details of the scene. Such motion may be provided by the movement of a platform upon which the detector array is mounted (e.g., an air vehicle). Alternatively, such motion may be provided by "dithering" the detector array by a known amount using an appropriate dithering mechanism. Such dithering mechanisms are known to those skilled in the art. However, this dithering approach requires additional system complexity for dithering the detector array and requires additional processing of dithered image data.

It would be desirable to have a scene-based method and apparatus of compensating for FPN due to non-uniformity in the response of detector arrays that does not require repeated blurring of scene imagery, that does not require motion of an image relative to the detector array and that does not require complex dithering to achieve such motion. In addition, it would be desirable to have a scene-base approach that compensates for non-uniformity in the response of detector arrays that provides for improved performance over conventional methods of non-uniformity correction of FPN associated with detector arrays.

SUMMARY

A method and apparatus for providing corrected values of gain and level coefficients of a set of correction coefficients for a scanning detector array comprising a plurality of detector channels is described. According to an exemplary aspect, first values of the gain and level coefficients can be modified using at least one frame of image data collected by the scanning detector array from out-of-focus multiple-temperature imagery. In addition, updated values of the gain and level coefficients can be determined using a scene-based non-uniformity correction (SBNUC) routine applied to scene data corresponding to focused scene imagery.

According to another exemplary aspect, determining updated values of the gain and level coefficients using the SBNUC routine can comprise acquiring a frame of the scene data corresponding to focused scene imagery, applying a response correction to the frame of scene data using existing values of the gain and level coefficients to provide a corrected frame of scene data, and adjusting the existing values of the gain and level coefficients using the SBNUC routine applied to the corrected frame of scene data, wherein the existing values of the gain and level coefficients are replaced with updated values.

According to another exemplary aspect of the present invention, the steps of acquiring a frame of scene data, applying a response correction, and adjusting the existing values of the gain and level coefficients can be repeated iteratively such that the updated values of the gain and level coefficients converge to respective stable values.

According to another exemplary aspect of the invention, adjusting the existing values of the gain and level coefficients using the SBNUC routine can comprise generating a preliminary level correction factor for each detector channel using a frame of scene data, generating a gain correction factor for each detector channel using the frame of scene data, generating a gain-induced level correction factor for each detector channel based upon the gain correction factor, and updating the existing values of the gain and level coefficients for each detector channel using the preliminary level correction factor, the gain-induced level correction factor, and the gain correction factor for each channel.

According to another exemplary aspect, generating a preliminary level correction factor for each channel can comprise applying a first vertical high pass filter to the frame of input scene data to generate a frame of first high-passed data, applying a horizontal infinite impulse response filter to the frame of first high-passed data to generate a frame of second high-passed data, applying thresholding based upon the frame of first high-passed data and the frame of second high-passed data to generate a frame of thresholded data, and averaging the values of pixels in each row of a frame of data generated from the previous step to generate row averages to provide preliminary level correction factors.

According to another exemplary aspect, generating a gain correction factor for each detector channel can comprise applying high-pass filtering and thresholding to the frame of input scene data, identifying positive pixel values and negative pixel values for each row of a frame of data generated from the previous step, calculating a row average (AVG POS) of the pixel values of the frame of input scene data corresponding to the positive pixel values and calculating a row average (AVG NEG) of the pixel values of the frame of input scene data corresponding to the negative pixel values for each row of the frame of input scene data, comparing AVG POS to AVG NEG for each row of the frame of input scene data, and determining a gain correction factor for each detector channel corresponding to each row of the frame of input scene data based upon the comparison between AVG POS to AVG NEG.

In another exemplary aspect, generating a gain-induced level correction factor for each detector channel can comprise applying high-pass filtering and thresholding to the frame of input scene data to provide a frame of thresholded data, identifying positive pixel values and negative pixel values for a frame of data generated from the previous step, calculating a total average pixel value (TOT AVG) of pixels of the frame of input scene data corresponding to the positive pixel values and the negative pixel values, and calculating the gain-induced level correction factor for each detector channel based upon TOT AVG and the gain correction factor for each detector channel.

BRIEF DESCRIPTION OF THE FIGURES

Other objects and advantages of the present invention will become apparent to those skilled in the art upon reading the following detailed description of exemplary embodiments, in conjunction with the accompanying drawings, wherein.

DETAILED DESCRIPTION

Various aspects of the invention will now be described in connection with a number of exemplary embodiments. To facilitate an understanding of the invention, many aspects of the invention are described in terms of actions to be performed by a processor unit, a processor, and/or a field programmable gate array (FPGA) device. It will be recognized that in each of the embodiments, the various actions could be performed by elements of a computer system. Further, it will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier such as solid-state memory, magnetic disk, optical disk or modulated carrier wave (such as radio frequency, audio frequency or optical frequency modulated carrier waves) containing an appropriate set of computer instructions that would cause a processor to carry out the techniques described herein. Further, the invention can additionally be considered to be embodied within an appropriate set of computer instructions that can be downloaded via a network connection to cause a processor to carry out the techniques described herein. Thus, the various aspects of the invention can be embodied in many different forms, and all such forms are contemplated to be within the scope of the invention. For each of the various aspects of the invention, any such form of embodiment can be referred to herein as "logic configured to" perform a described action, or alternatively as "logic that" performs a described action.

Figure 1:
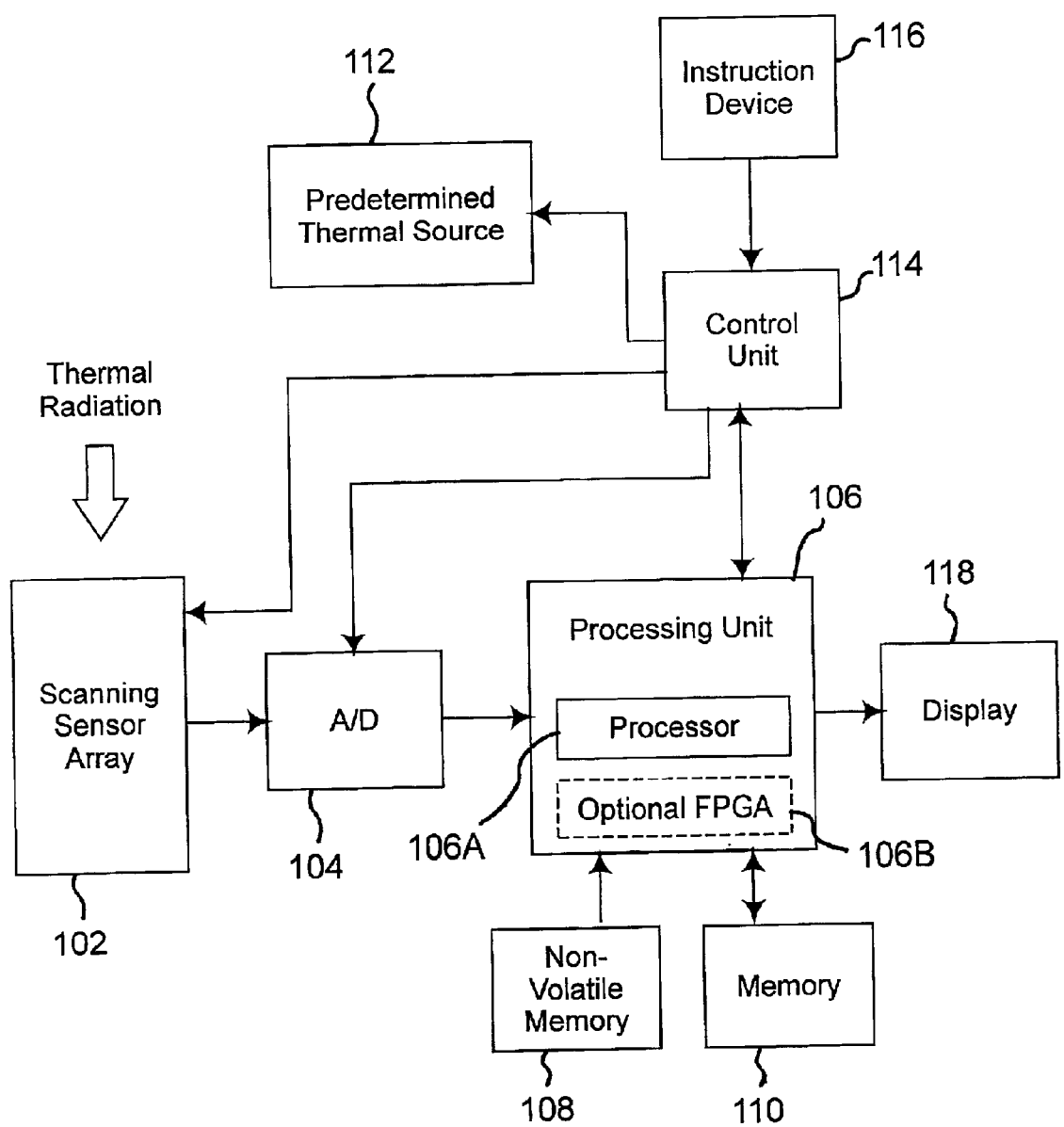
FIG. 1 is a block diagram illustrating an imaging apparatus in accordance with an exemplary aspect of the present invention.

FIG. 1 illustrates a block diagram of an apparatus 100 for gathering and processing imagery, such as infrared (IR) imagery, according to an exemplary aspect of the present invention. The apparatus 100 could, for example, be incorporated into a forward looking infrared (FLIR) camera system such as that described in commonly-assigned U.S. Pat. No. 6,359,681 "Combined Laser/FLIR Optics System", the disclosure of which is hereby incorporated by reference in its entirety. channels (e.g., 480 channels) and is configured to collect data corresponding to two-dimensional imagery using appropriate optics (not shown), such as IR optics, and a scanning mechanism (not shown), such as a scanning mirror, as known to those skilled in the art. The scanning can be carried out such that the scanning detector array 102 scans the field of view of the apparatus 100 wherein each detector channel acquires imagery data for a specified integration time (also referred to as a dwell time) corresponding to a pixel of data. For example, the scanning detector array 102 can be configured to collect imagery data corresponding to frames of data having 480×1716 pixels wherein each detector channel collects a row of imagery data comprising 1716 pixels. Of course, the frame size is not limited to this size and can be selected as desired. More details pertaining to the scanning detector array 102 will be described below. The scanning detector array 102, its supporting electronics and cooling mechanism (not shown), and the appropriate optics (not shown) can be mounted in a pod (not shown) that can be gimbal-mounted to an appropriate platform (e.g., an air vehicle) as known to those skilled in the art.

The apparatus 100 can also comprise an analog-to-digital converter (A/D) 104 for converting analog imagery data into digital imagery data. The apparatus 100 also comprises a processing unit 106 which, in turn, comprises a processor 106A and can comprise an optional field programmable gate array (FPGA) device 106B for assisting with numerical computations. The utilization of FPGA devices to assist with numerical processing is known to those skilled in the art. The processing unit 106 processes imagery corresponding to radiation gathered by the scanning detector array 102 as will be discussed in greater detail below. The apparatus 100 can also comprise a non-volatile memory 108 and an additional memory 110. The non-volatile memory 108 can be utilized for storing initial values (e.g., factory-calibrated values) of correction coefficients for correcting imagery gathered by the scanning detector array as will be described in greater detail below. The additional memory 110 can be utilized for storing updated values of correction coefficients, such as gain and level coefficients.

The apparatus 100 can further comprise a predetermined source 112 (e.g., a thermal source) for calibration and a mechanism (not shown) for selectively placing the predetermined source 112 in a position such that the scanning detector array 102 can receive radiation emitted by the predetermined source 112. Alternatively, IR optics (not shown) capable of collecting radiation from the predetermined source 112 onto the scanning detector array could be utilized.

The apparatus 100 can also include a control unit 114 for controlling the scanning detector array 102, the A/D converter 104, the processing unit 106, and the predetermined thermal source 112 and associated mechanism. In particular, the control unit 114 can control the gathering of successive frames of data by the scanning detector array as well as the A/D conversion of those frames of data and their subsequent processing by the processing unit 106. Moreover, the apparatus 100 can include an instruction device 116 that enables operation of the control unit. For example, the instruction device 116 could be a power control switch or a more complex device providing the ability to additionally adjust various parameters such as the dwell time of the scanning detector array. In addition, the apparatus 100 can also comprise a display 118 for displaying imagery processed by the processing unit 106.

The scanning detector array 102 can be any suitable detector known to those skilled in the art for gathering imagery of a desired wavelength. For example, the scanning detector array 102 can be a HgCdTe-based scanning detector array or other type of detector known to those skilled in the art. An exemplary scanning detector array 102 is a HgCdTe-based array with a 480×4 channel configuration wherein the detector comprises 480 channels with 4 detector elements per channel. Such detectors are known to those skilled in the art and are based on the concept of time delay integration (TDI) wherein data gathered by each of the four detector elements of a given channel is integrated over a specified scanning acquisition time. Data gathered by such scanning detector arrays can be viewed as providing automatic averaging of data over the four detector elements for each given channel of the detector. Alternatively, the scanning detector array 102 could possess a 480×5 configuration, a 480×6 configuration, a 480×8 configuration, or any other suitable configuration. Among the exemplary detectors that can be used are those manufactured by DRS Infrared Technologies, Inc. (Dallas, Tex.) and AIM (AEG Infrarot-Module GmbH, Heilbronn, Germany). A scanning detector array with a 480×4 configuration manufactured by AIM (AEG Infrarot-Module GmbH, Heilbronn, Germany) has been found to be advantageous. The scanning detector array 102 can be SADA (Standard Advanced Dewar Assembly) compliant.

The optional FPGA device 106B illustrated in FIG. 1 can be any appropriate conventional FPGA device, such as the Virtex and Virtex-E series devices manufactured by Xilinx, Inc. (San Jose, Calif.). The processor 106A can be any appropriate processor such as, for example, a high-performance Altivec microprocessor manufactured by Motorola. In the exemplary apparatus 100, it has been found to be advantageous to utilize an optional FPGA such as the Virtex series devices to provide dedicated numerical computation capability in conjunction with present generation processors. However, it will be readily apparent to those skilled in the art that as processor power continues to increase, it can become desirable to carry out all numerical computations within the processor 106A itself, thereby eliminating the FPGA device 106B. Utilizing a processor 106A without the optional FPGA device 106B can be beneficial from the standpoint of programming flexibility. In an exemplary aspect of the present invention, given the computational power of present generation processors, it can be advantageous to allocate two-dimensional processing tasks to the FPGA 106B and one-dimensional processing tasks to the processor 106A.

The predetermined thermal source 112 can be any suitable thermal source such as a black body radiation source for producing a known temperature or a bland source at ambient temperature. In an exemplary aspect of the invention, it has been found advantageous to utilize a bland source with a substantially uniform spatial structure and a smooth surface as well as a spatially uniform temperature. An exemplary bland source is a small copper slug or disk that has been painted black. Such a bland source can be mounted on a filter wheel mechanism known to those skilled in the art to position the thermal source in an appropriate line of sight with the scanning detector array.

It should be understood that variations in the configuration of the apparatus 100 can be utilized without departing from the teachings of the present invention. For example, the non-volatile memory 108 and the additional memory 110 could optionally be provided within the processing unit 106 itself. Those skilled in the art will appreciate that the A/D convertor 104, the FPGA device 106B (including any of the individual functions of the disclosed FPGA device 106B), and any other desired functions can be embodied in individual components or in integral units.

Figure 2A:
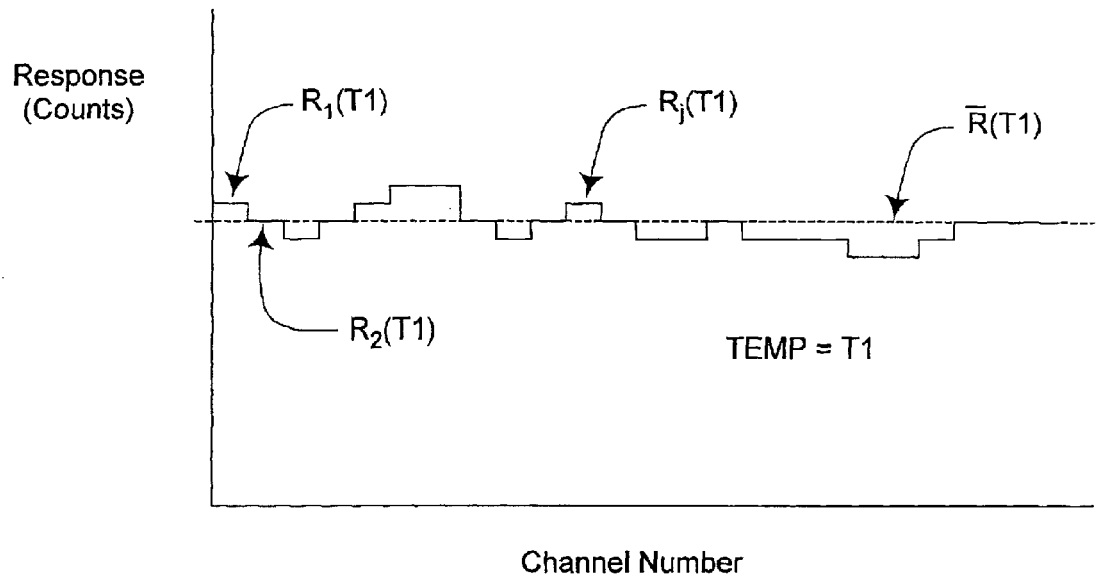
FIG. 2A is an illustration of a hypothetical response for a scanning detector array at a reference temperature T1 according to an exemplary aspect of the present invention.

Because of manufacturing imperfections, the response function of a scanning detector array such as detector 102 illustrated in FIG. 1, is not expected to be perfect (i.e., flat). Rather, detector channels viewing the same thermal source and receiving the same radiation dose can yield different output levels measured in voltage or, equivalently, in photon counts. A hypothetical response function for a scanning detector array, such as detector 102 illustrated in FIG. 1, illuminated with a uniform dose of radiation over the entire array from a known thermal source of a given temperature is shown in FIG. 2A. As illustrated in FIG. 2A, the scanning detector array 102 can exhibit a non-flat response. The response of a given detector channel, $R_j(T1)$, can differ from an average response, $\overline{R}(T1)$, characteristic of the entire detector array for the given incident radiation. Data such as that illustrated in FIG. 2A is gathered over a predetermined integration time or dwell time, the integration time being a time period over which a given channel of the scanning detector array 102 gathers data. Shorter or longer integration times will result in corresponding changes to the response data (e.g., more photon counts can be measured at longer dwell times).

Figure 2B:
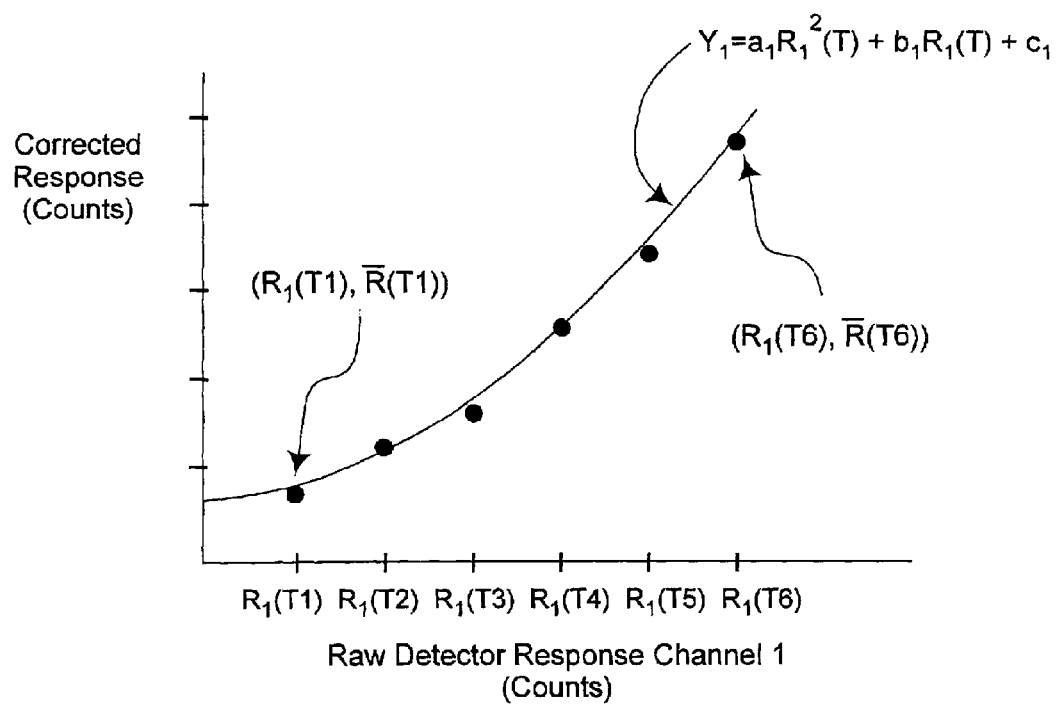
FIG. 2B is an illustration of a hypothetical calibration curve of a given channel (e.g., channel 1) of a scanning detector array, the calibration curve being based upon level, gain and moment terms over 6 different reference temperatures.

In an exemplary aspect of the present invention, detector response data, such as illustrated in FIG. 2A, can be collected for a plurality of temperatures and fitted with a quadratic formula to provide initial (e.g., factory-calibrated) values of the correction coefficients for the scanning detector array 102. For example, hypothetical detector response data collected from six known thermal sources at temperatures T1–T6 are illustrated in FIG. 2B for one detector channel (e.g., channel 1). In FIG. 2B, the average detector response for the detector array overall is plotted versus the individual response of a given detector channel (e.g., channel 1) at each temperature. As illustrated by the equation for $Y_1$, the data for each individual channel can be fit by a quadratic curve for each individual channel wherein the coefficient $a_1$ is a moment coefficient (i.e., corresponding to a quadratic term), $b_1$ is a gain coefficient, and $c_1$ is a level coefficient. The remaining detector channels can similarly be characterized by a corresponding set of moment, gain and level coefficients.

A response correction to imagery data using the initial (e.g., factory-calibrated) values of the correction coefficients can be carried out channel by channel using the characteristic quadratic curve for each channel, such as that hypothetically shown in FIG. 2B for channel 1. In particular, a given measured signal value corresponding to imagery data can be associated with a value on the X axis of the quadratic curve shown in FIG. 2B. This measured signal value can then be directly correlated to a corrected value on the Y axis. As noted previously, the hypothetical data illustrated in FIGS. 2A and 2B are determined using a predetermined integration time. If imagery data to be corrected is expected to be gathered using a different integration time, then initial (e.g., factory-calibrated) values of the correction coefficients should also be provided corresponding to that integration time. Alternatively, the response data, such as that illustrated in FIGS. 2A and 2B can be normalized to integration time if the detector response is sufficiently linear as a function of integration time.

A response correction of imagery data can be performed using a quadratic correction based upon moment, gain and level coefficients and that the techniques described herein are consistent with such a quadratic correction. Alternatively, a more conventional "two-point" correction based upon only gain and level coefficients could also be utilized with the techniques described herein.

Although initial (e.g., factory-calibrated) values of the correction coefficients can provide a response correction for FPN over the calibration temperature range (e.g., T1–T6 in FIG. 2B) such initial values of the correction coefficients can fail to provide adequate correction outside the calibration temperature range and can further fail to provide adequate correction as the detector ages and suffers drift. Accordingly, exemplary aspects of the present invention wherein such initial (e.g., factory-calibrated) values of the correction coefficients are corrected using scene-based methods will now be described.

Figure 3:
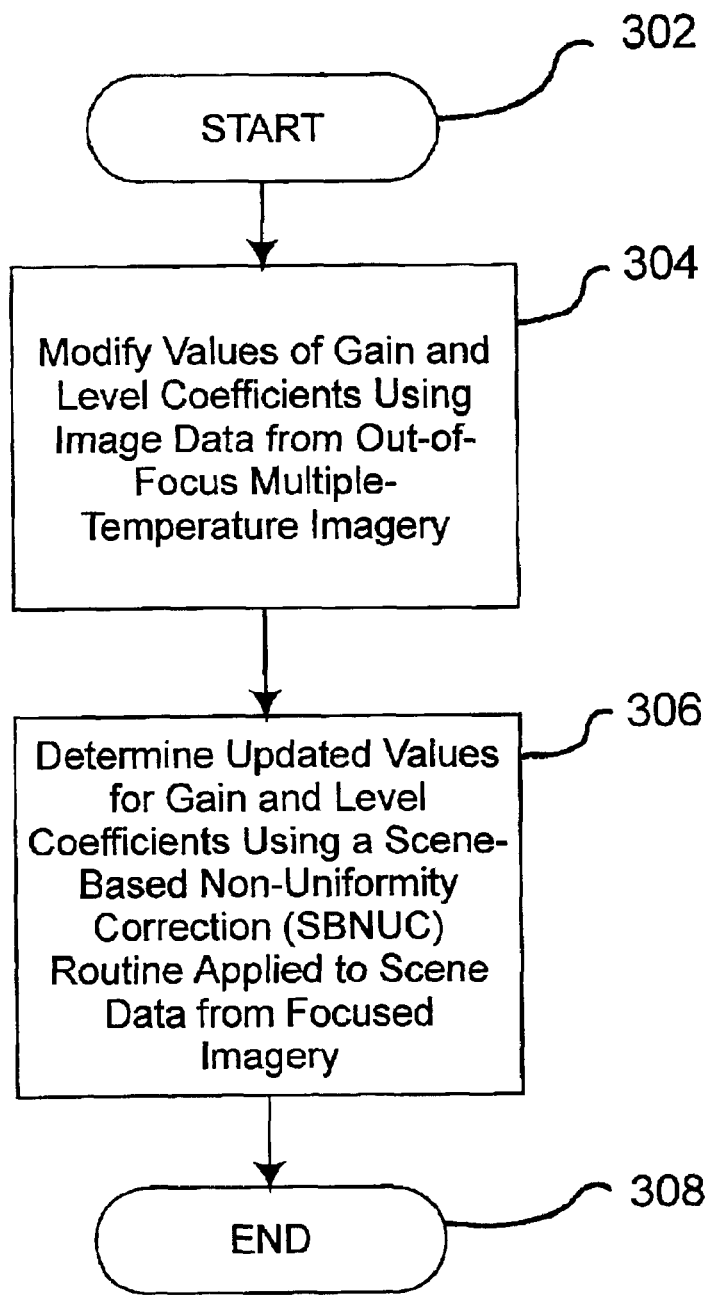
FIG. 3 is a block diagram of an approach for correcting gain and level coefficients of a set of correction coefficients according to an exemplary aspect of the present invention.

FIG. 3 is a block diagram of an exemplary approach 300 for providing corrected values of gain and level coefficients of a set of correction coefficients for a scanning detector array, such as the scanning detector array 102. Exemplary process steps begin at step 302. As indicated at step 304, the approach 300 comprises modifying values (e.g., first values) of gain and level coefficients using at least one frame of image data collected by the scanning detector array from out-of-focus multiple-temperature imagery. The first values of the gain and level coefficients to be modified can be the initial (e.g., factory-calibrated) values, or they can be subsequent values of the gain and level coefficients, wherein the initial level values have already undergone an initial power-up correction, such as described in greater detail below. As indicated at step 306, the approach 300 also comprises determining updated values of the gain and level coefficients using a scene-based non-uniformity correction (SBNUC) routine applied to scene data corresponding to focused scene imagery. The SBNUC routine referred to in FIG. 3 is not restricted to any particular SBNUC routine and can be any suitable routine that can be used to adjust the values of the gain and level coefficients using focused scene-based imagery. Whatever SBNUC routine is utilized, the step of modifying the first values of the gain and level coefficients (step 304) can comprise applying that SBNUC routine to the frame of image data collected from out-of-focus multiple-temperature imagery. In addition, step 306 can be repeated iteratively such that updated values of the gain and level coefficients converge to respective stable values. Accordingly, step 304 can be viewed as a power-up correction (or as a portion of a power-up correction) of the first values of the gain and level coefficients that can be applied each time the scanning detector array 102 is powered up, and step 306 can be viewed as an iterative correction for determining updated values of the gain and level coefficients.

Figure 4:
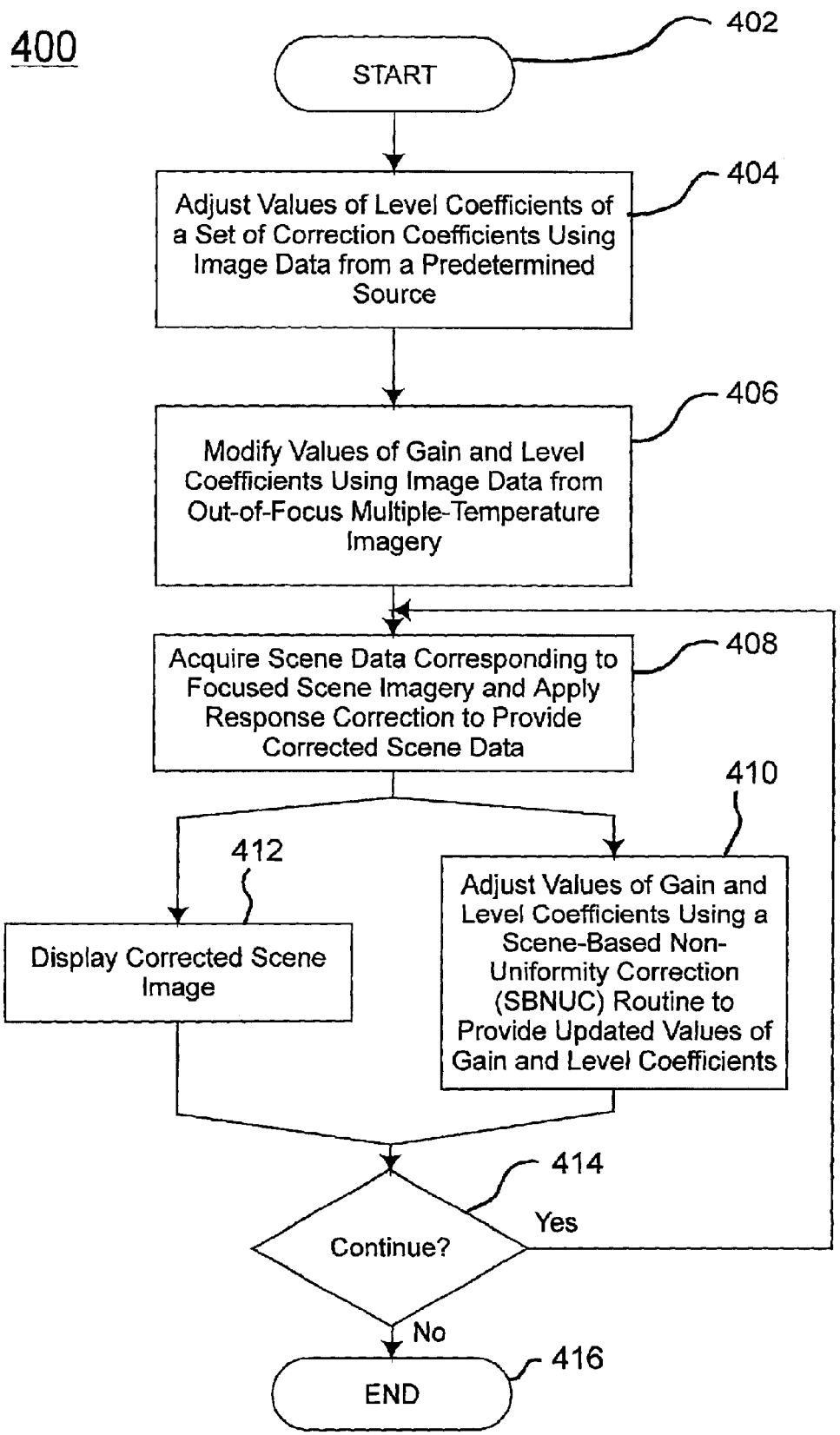
FIG. 4 is a block diagram illustrating steps utilized by an apparatus incorporating non-uniformity correction according to an exemplary aspect of the present invention.

FIG. 4 is a block diagram illustrating an exemplary approach 400 for providing corrected gain and level coefficients beginning at step 402 according to the present invention. The approach 400 can include a step 404 wherein initial values of level coefficients of the set of initial correction coefficients are adjusted using image data from a predetermined thermal source, such as predetermined source 112, which can be a black body radiation source at a known temperature or which can be a bland source having a substantially uniform spatial structure and a substantially uniform temperature, which can be an ambient temperature. The resulting adjusted values of the level coefficients and the initial values of the gain coefficients can be viewed as first values of the level and gain coefficients to be further corrected. Step 404 can be referred to as a "one-touch" correction known to those skilled in the art. If step 404 is not carried out, the first values of the gain and level coefficients can be the initial (e.g., factory-calibrated) values of the gain and level coefficients.

The approach 400 further includes step 406 wherein the first values of the level and gain coefficients are modified using at least one frame of image data collected by the scanning detector array 102 from out-of-focus multiple-temperature imagery. Steps 404 and 406 together can be viewed as initial and secondary portions, respectively, of a power-up correction that can be carried when desired (e.g., each time the scanning detector array 102 is powered-up) to compensate for power-up variations in the gain and level coefficients.

As noted at step 408, a frame of scene data corresponding to focused imagery can be acquired and a response correction can be applied to the frame of scene data using existing values of the gain and level coefficients to provide a frame of corrected scene data. At this stage of the approach 400, the existing values of the gain and level coefficients are those generated by step 406. In addition, as noted at step 410, the existing values of the gain and level coefficients can then be adjusted using a SBNUC routine. In an exemplary aspect of the present invention, step 410 can be viewed as occurring in two steps: using a SBNUC routine to generate gain and level correction factors and using an update routine to provide updated gain and level coefficients based upon the gain and level correction factors. As indicated previously, the SBNUC routine referred to here is not restricted to any particular SBNUC routine and can be any suitable routine that can enable the adjustment of values of the gain and level coefficients using focused scene-based imagery. As noted at step 412, a corrected scene image corresponding to the frame of corrected scene data can also be displayed on a display, such as display 118, during this time.

The approach 400 can also include a decision step 414 wherein it is determined whether or not to continue (e.g., a determination can be made as to whether the power to the apparatus 100 is on) and, if so, additional scene data can be acquired and another response correction to the additional scene data can be applied using the updated values of the gain and level coefficients. Moreover, the updated values of the gain and level coefficients from the previous iteration can be once again updated using the SBNUC routine as indicated at step 410. This process can be repeated iteratively such that the values of the gain and level coefficients are continually updated, thereby converging to respective stable values. It should be noted that step 406 can be carried out using the same SBNUC routine referred to in step 410.

An exemplary power-up correction 500 consistent with steps 404 and 406 in FIG. 4 will now be described with reference to FIG. 5. Steps 504–512 can be viewed as corresponding to the initial power-up correction of step 404, and steps 514–516 can be viewed as corresponding to the secondary power-up correction of step 406. However, it should be noted that steps 404 and 406 in FIG. 4 are not intended to be limited to the example illustrated in FIG. 5.

Figure 5:
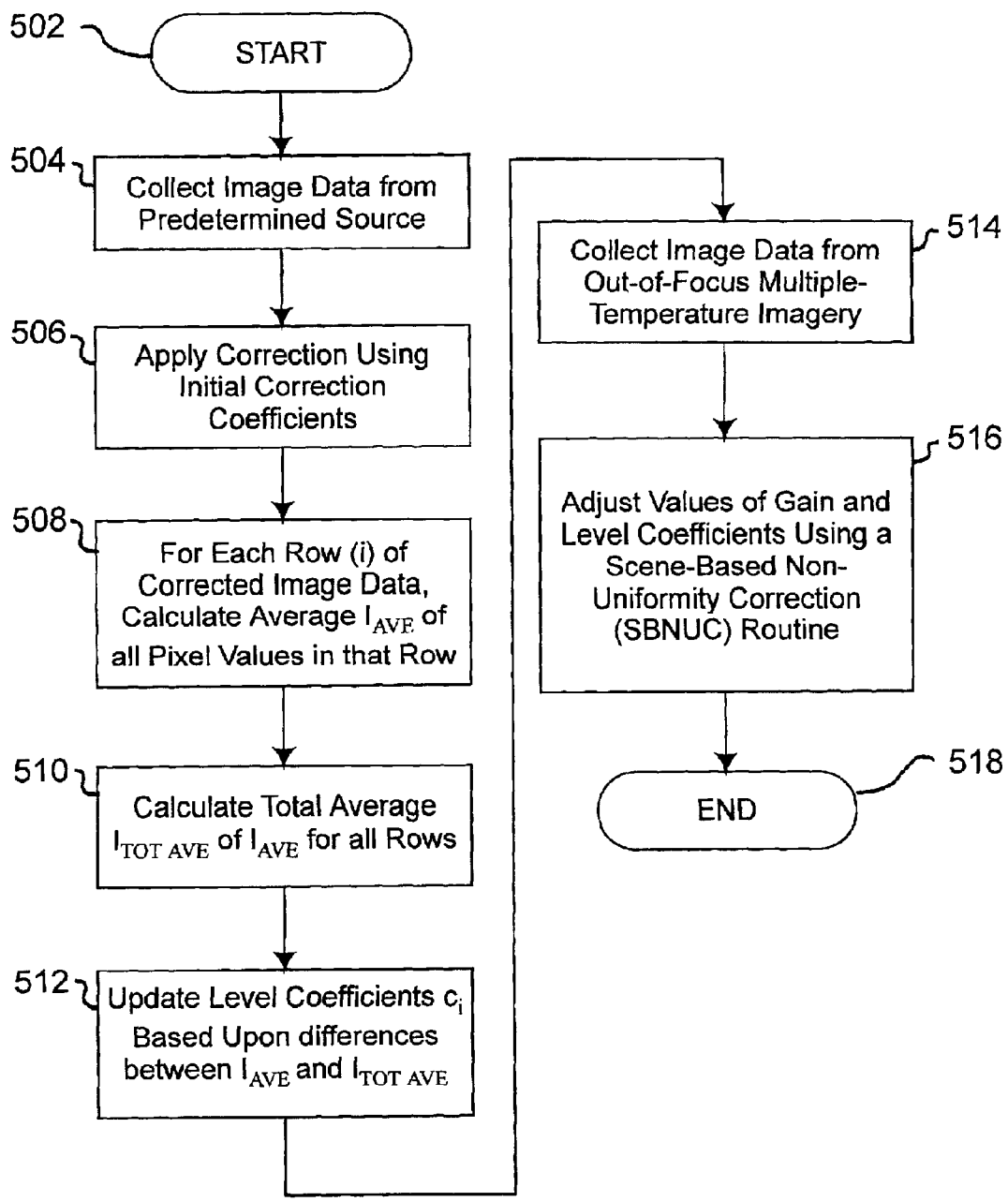
FIG. 5 is a block diagram illustrating a power-up correction according to an exemplary aspect of the present invention.

FIG. 5 illustrates an exemplary power-up correction 500 beginning at step 502. As indicated at step 504, the power-up correction 500 can comprise collecting a frame of image data from predetermined source 112, which can be an out-of-focus bland source such as a copper disk that has been painted black, such as noted previously. As indicated at step 506, a correction can then be applied to the frame of image data from the bland source using the initial (e.g., factory-calibrated) values of the correction coefficients. In particular, the correction to the frame of image data from the bland source can be carried out channel by channel using a quadratic curve comprising moment, gain and level coefficients, such as the quadratic curve corresponding to hypothetical data shown in FIG. 2B as noted previously. For example, raw image data from the bland source can be associated with X-axis values of the quadratic curve, and corrected values of the image data for the bland source can be obtained from the corresponding Y-axis values according to the correlation given by the quadratic curve.

As indicated at step 508, for each row (i) of image data corrected in step 506, an average, $I_{AVE}$, can be calculated of all pixel values in that row. Then, as indicated at step 510 a total average, $I_{TOT\ AVE}$, of $I_{AVE}$ for all rows can then be calculated. As indicated at step 512, the level coefficient, $c_i$, for each detector channel (i) can then be updated based on difference between $I_{AVE}$ and $I_{TOT\ AVE}$ for that row. In particular, the quantity $I_{AVE}-I_{TOT\ AVE}$ can be calculated for each detector channel (i) and the resulting quantity can be subtracted from the existing level coefficient, $c_i$, for that detector channel to provide the updated level coefficient.

A secondary power-up correction represented by steps 514–516 corresponding to step 406 in FIG. 4 can also be carried out. Whereas the initial power-up correction described above is configured to adjust the level coefficients, the secondary power-up correction can adjust both gain and level coefficients. To adjust gain as well as level, a frame of image data from out-of-focus multiple-temperature imagery should be collected by the scanning detector array 102 as indicated at step 514. For example, optics (e.g., IR optics not shown in FIG. 1) can be set to a defocus condition, and the pod (not shown in FIG. 1) supporting the scanning detector array 102 and the optics can be slued such that the field of view of the apparatus 100 is exposed to multiple-temperature imagery, such as a combination of sky and clouds. Moreover, each detector channel of the scanning detector array 102 should be exposed to at least two temperatures such that each row of the resulting frame of image data contains data from at least two temperatures. As indicated at step 516, existing values of gain and level coefficients can then be adjusted using a SBNUC routine applied to the frame of image data obtained from out-of-focus multiple-temperature imagery. The SBNUC routine can be the same as that utilized at step 410 as illustrated in FIG. 4. The above-noted steps pertaining to multiple-temperature imagery can be carried out for a predetermined time such that at least one frame of image data from multiple-temperature imagery is collected and processed. For example, data from multiple-temperature imagery can be collected and processed for approximately 5–10 seconds (e.g., corresponding to approximately 150–600 frames of image data from multiple-temperature imagery).

It is beneficial to carry out steps 514–518 using multiple temperature imagery that is out of focus, because high-spatial-frequency features of the imagery are thereby eliminated, ensuring that any high frequency characteristics observed in the image data from the out-of-focus imagery are due to FPN which can then be addressed using the SBNUC routine. Moreover, if the SBNUC routine referred to in step 516 involves a thresholding step, such as will be described below, it is desirable for step 516 to be carried out with the thresholds set at their maximum possible values. In other words, for example, if the apparatus 100 is configured to collect 12-bit imagery, the thresholds should be set to a value of 4095 corresponding the highest pixel intensity value during step 516 such that essentially no image data is rejected during the thresholding operation.

An exemplary SBNUC routine 600 that can be utilized in steps 410 and 516 will now be described with reference to FIG. 6. In addition to being useable in steps 410 and 516, in an exemplary aspect of the invention, the SBNUC routine itself can provide a method of correcting values of gain and level coefficients of a set of correction coefficients for a scanning detector array, such as scanning detector array 102.

Figure 6:
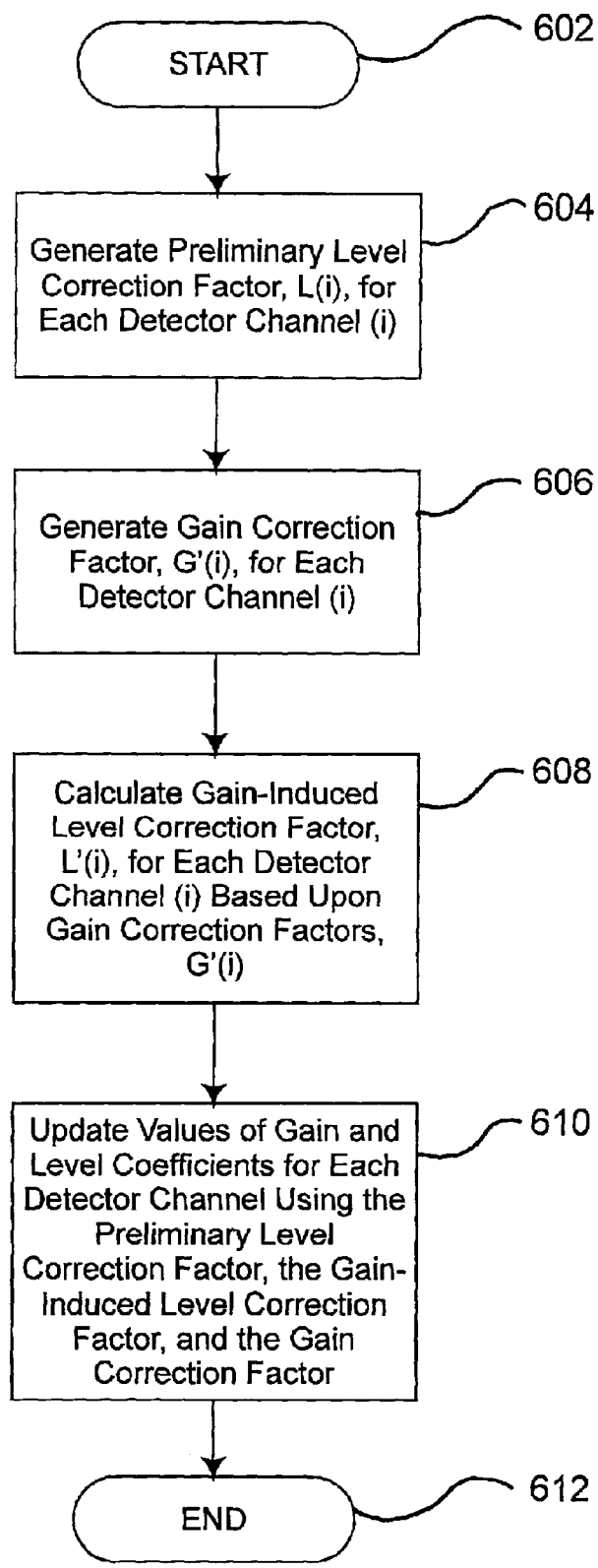
FIG. 6 is a block diagram illustrating a scene-based non-uniformity correction (SBNUC) routine according to an exemplary aspect of the present invention.

FIG. 6 is a block diagram illustrating process steps of an exemplary SBNUC routine 600 beginning at step 602. As noted at step 604, the SBNUC routine 600 comprises generating a preliminary level correction factor, L(i), for each detector channel (i). The SBNUC routine 600 further comprises generating a gain correction factor, G'(i), for each detector channel (i) as indicated at step 606. Moreover, as indicated at step 608, the SBNUC routine 600 further comprises calculating a gain-induced level correction factor, L'(i), for each detector channel (i) based upon the gain correction factor, G'(i). In addition, as indicated at step 610, the SBNUC routine further comprises updating the existing values of the gain and level coefficients for each detector channel using the preliminary level correction factor, the gain-induced level correction factor, and the gain correction factor. It should be noted that whereas the SBNUC routine is described in terms of steps 604–610, step 610 could alternatively be described as corresponding to a separate update routine, in which case steps 604–608 would correspond to the SBNUC routine.

In an exemplary aspect of the present invention, the latter step of updating the existing values of the gain and level coefficients can comprise adding the preliminary level correction factor and the gain-induced level correction factor for each detector channel (i), thereby forming a sum corresponding to each detector channel. This sum can then be subtracted from the existing value of the level coefficient, $c_i$, for each detector channel to form the updated value of the level coefficient. In addition, the step of updating can further comprise multiplying the existing value of the gain coefficient, $b_i$, for each channel by the gain correction factor, G'(i), corresponding to that channel to form the updated value of the gain coefficient, $b_i$, for each detector channel.

In addition, according to another exemplary aspect of the invention, the steps of generating a preliminary level correction factor for each detector channel, generating a gain correction factor for each detector channel, generating a gain-induced level correction factor for each detector channel, and updating existing values of the gain and level coefficients can be repeated iteratively using successive frames of input scene data such that updated values of the gain and level coefficients converge to respective stable values.

Exemplary aspects of the steps of generating a preliminary level correction factor, generating a gain correction factor, and generating a gain-induced level correction factor will now be described in greater detail with reference to FIGS. 7–10. The updating step will be further described with reference to FIG. 11.

Figure 7:
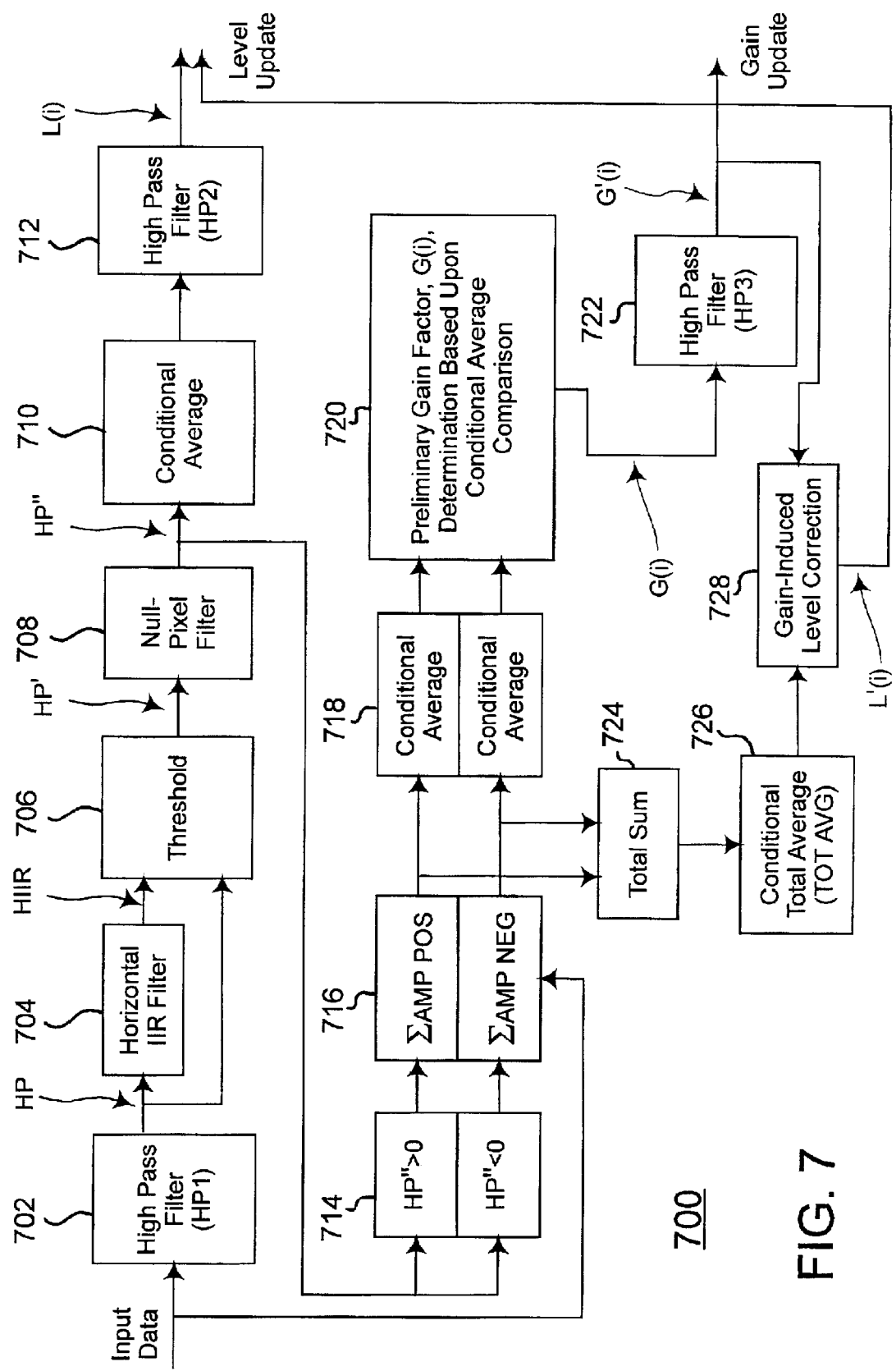
FIG. 7 is a functional block diagram illustrating functional aspects of an exemplary SBNUC routine according to the present invention.

FIG. 7 is a functional block diagram of an exemplary SBNUC routine consistent with the formulation illustrated in FIG. 6. However, the SBNUC routine illustrated in FIG. 6 is not intended to be limited to the subject matter illustrated in FIG. 7. Moreover, the block diagrams of FIGS. 8, 9, 10 and 11 are also consistent with steps 604, 606, 608 and 610, respectively, shown in FIG. 6. However, steps 604, 606, 608 and 610 are not intended to be limited to the subject matter illustrated in FIGS. 8, 9, 10 and 11, respectively.

An exemplary level routine 800 pertaining to generating a preliminary level correction factor for each detector channel consistent with the SBNUC routine 700 will now be described with reference to FIGS. 7 and 8. As indicated at block 702 of FIG. 7 and at step 804 of FIG. 8, a two-dimensional frame of input scene data is directed to a vertical high-pass filter (HP1) to generate a frame high-passed data (HP data) (e.g., first high-passed data). The HP1 filter is carried out by choosing a given pixel to be a central pixel with two vertically adjacent pixels (one above and one below), multiplying the three pixel values by appropriate scale factors, and subtracting from the value of the central pixel the sum of the pixel values above and below; the resulting value is assigned to be the corresponding pixel value for the frame of HP data. A pixel of one frame "corresponds" to a pixel of another frame if the pixels have the same column and row location. The HP1 filter is accordingly a convolution filter and can be carried out in binary form with a (−0.25, 0.5,−0.25) kernel (the negative signs indicate subtraction as described above). This kernel is the same as a true high-pass filter with the coefficients of (−⅓, +⅔, −⅓) * d1 where the factor d1=¾ is a damping factor. The d1=¾ damping factor has the beneficial effect of damping the filtered values to enhance stability of the SBNUC routine and also provides for ease of implementation in a binary hardware design because the damped filter provides for divide-by-two and divide-by-four arithmetic operations. Generally, the damping factor d1 can range from approximately 0.5–0.95; d1=0.75 has been found to be advantageous. The HP1 high-pass filter (and other high-pass filters disclosed herein) can be applied to edge pixels using techniques well known in the art such as mirroring pixels about the edge, folding pixels about the edge, replicating edge pixels, and padding edge pixels with zeros, as disclosed, for example, in above-incorporated U.S. Patent Application entitled "Dynamic Range Compression", Ser. No. 09/841,081.

It will be recognized that the frame of HP data from the high-pass filter (HP1) 702 is transformed such that the pixel values of the HP data deviate positively or negatively from a value of zero. In other words, areas of the frame of input scene data that have a flat contrast (no intensity variation) yield corresponding regions of HP data with pixel values of zero.

As indicated at block 704 and at step 806, the HP data is then directed to a horizontal infinite impulse response (HIIR) filter to generate a frame of HIIR data (e.g., second high-passed data). IIR filters are known in the art and are carried out such that a past pixel value is multiplied by a first coefficient, f1, and a present adjoining pixel value is multiplied by a second coefficient, f2, where f1+f2=1. These two products are then added together, and the resulting sum becomes the pixel value of the HIIR data corresponding to the pixel location of the noted present pixel. The HIIR filter 704 can be provided to determine bland regions of the frame of HP data. In an exemplary aspect of the invention, the HIIR filter illustrated in block 706 is carried out with factors that emphasize the past pixel value more than the present pixel value (f1>f2). Generally, selections for f1 and f2 can range from (f1=0.75, f2=0.25) to (f1=0.95, f2=0.05). A configuration wherein f1=0.95 and f2=0.05 has been found to be advantageous.

As indicated at block 706 and at step 808, the frame of HP data and the corresponding frame of HIIR data are then directed to a threshold filter 706 wherein thresholding is carried out based upon both the frame of HP data and the frame of HIIR data to generate a frame of thresholded data (e.g., HP' data). In an exemplary aspect of the invention, the thresholding can be carried out such that a given pixel is passed to the next step (step 708) if it passes both of two thresholds. For example, a first determination is made as to whether an absolute value of an HP pixel value is greater than 0 and less than a first threshold value, t1. If this absolute difference is greater than the first threshold value, then that region of the image is highly dynamic and should not be included for processing by the SBNUC routine. A second determination is also made of whether an absolute value of a difference between the HP pixel value and the corresponding HIIR pixel value is less than a second threshold value, t2. If this second threshold is exceeded (i.e., the condition is not met), then the scene has significant high-frequency detail at that location and the associated pixel location should be excluded from processing by the SBNUC routine. On the other hand, if both of the first and second determinations are true, then a resulting pixel of the frame of thresholded data is assigned to have the pixel value of the frame of HP data. Otherwise, the pixel value of the frame of thresholded data is given an assigned value. In an exemplary aspect, the assigned value can be zero.

Proper thresholding is necessary to prevent memorization of the scene by the SBNUC routine. In an exemplary aspect, the first threshold value, t1, can be chosen to be in the range of approximately 1–1.5 times a temporal noise value of the scanning detector array 102. This threshold level can ensure that any bland region of the frame of input scene data is included in the processing by the SBNUC routine. Moreover, the second threshold value, t2, can be chosen at a level that is indicative of the FPN drift rate of the scanning detector array 102. The value of t2 should be low enough to allow any line-to-line errors that occur to be included in processing by the SBNUC routine, while not allowing scene edges to pass. In particular, t2 can be chosen to be in the range of approximately 3–4 times the temporal noise value. The temporal noise value can be measured at the factory using known techniques. It should be noted that the thresholding filter as configured should pass only noise data and should filter out any legitimate scene-related data. In other words, any pixel locations identified by the threshold filter 706 as having scene-related data should be assigned values of zero in the frame of thresholded data (HP' data).

Figure 8:
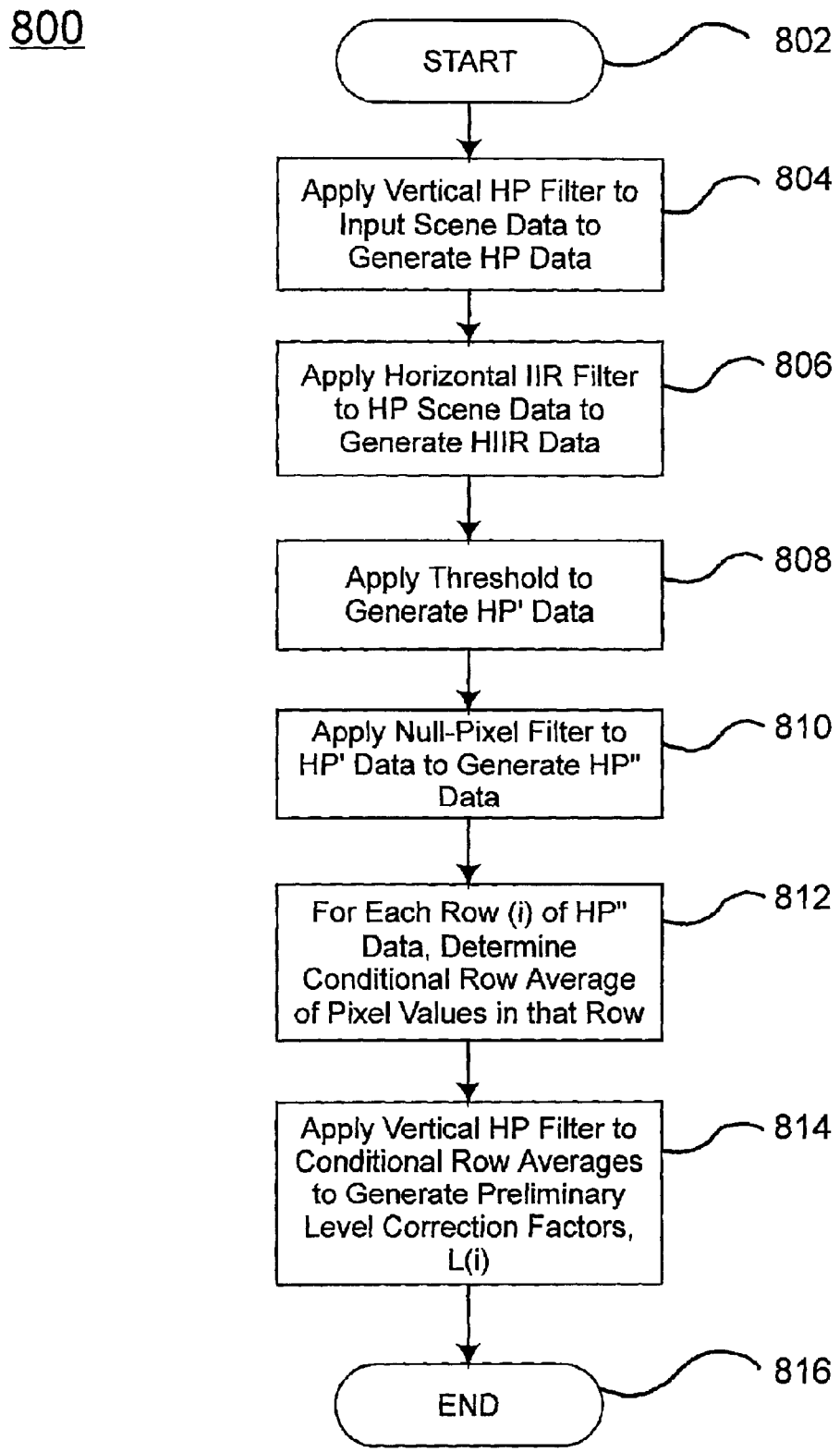
FIG. 8 is a block diagram illustrating a level routine of a SBNUC routine according to an exemplary aspect of the present invention.

In the example of FIGS. 7 and 8, a null-pixel filter can optionally then be applied to the frame of HP' data to generate a frame of HP" data as indicated at block 708 and step 810. Such a null-pixel filter 708 can identify null-pixels of the frame of thresholded data having values of zero and can assign vertically adjacent pixels within a predetermined number of pixels of the null-pixels to also have values of zero. In an exemplary aspect, the predetermined number of pixels can be one. This type of filter can be referred to as a "3×1 OR" filter because it can be implemented in the following manner: if pixel (i) is a present pixel, then pixel (i) can be assigned a value of zero if either the value of vertically adjacent pixel (i−1) is zero or the value of vertically adjacent pixel (i+1) is zero. As noted above, the thresholding filter 706 should pass only noise data and should filter out any legitimate scene-related data. Accordingly, the null-pixel filter 708 as described can work in conjunction with the thresholding filter 706 to ensure that scene-related data is not passed on for further processing in the determination of FPN of the scanning detector array 102.

The HP" data can then be directed to an averaging filter represented by block 710 as indicated at step 812, wherein, for each row of HP" data, the pixel values in that row are averaged. The averaging can be conditional averaging such that a row average is calculated if a number of non-zero pixels in that row is greater than a predetermined minimum number. The row average is then calculated based upon the values of the non-zero pixels (i.e., pixels with zero values are not considered in calculating the average). If the number of non-zero pixels in a given row does not exceed the predetermined minimum number, the row average is given an assigned value. The assigned value for the row average can be zero. In an exemplary aspect, the predetermined minimum number can range from approximately 0.25–0.8 times the number of pixels in a row of a frame of data. A predetermined minimum number of 0.6 times the number of pixels in a row has been found to be advantageous. The data generated by the averaging filter 710 can thereby provide a row average for each channel of the scanning detector array 102 corresponding to the amount of level (offset) correction appropriate for that detector channel. If the null-pixel filter 708 is not utilized, the HP' data from the threshold filter 706 is directed to the averaging filter 710.

In the example of FIGS. 7 and 8, the row averages can optionally then be further processed with a second high-pass filter (HP2) represented by block 712 and as indicated at step 814. Applying the HP2 filter can further ensure that no low-frequency scene-related content is memorized in generating updated level coefficients. The HP2 filter can be a vertical high-pass filter with a kernel of $d2\times(-\frac{1}{3}, \frac{2}{3}, -\frac{1}{3})$, where d2 is a damping factor. In an exemplary aspect, the damping factor d2 can range from approximately 0.5–1.0. Where a damping factor of d1 of 0.75 is used for filter HP1, it has been found advantageous to use a damping factor of approximately 1.0 for d2 (i.e., a true un-damped high-pass filter can be used). Those skilled in the art will recognize that smaller numbers for the damping factors result in relatively more damping. Moreover, damping factors of smaller values tend to provide for slower convergence to stable values for the updated level coefficients. An array of preliminary level correction factors, L(i), is thereby provided corresponding to the detector channels (i) which can be utilized as described below to provide updated level coefficients. If the HP2 filter 712 is not utilized, the preliminary level correction factors, L(i), can be provided by the averaging filter 710.

Figure 9:
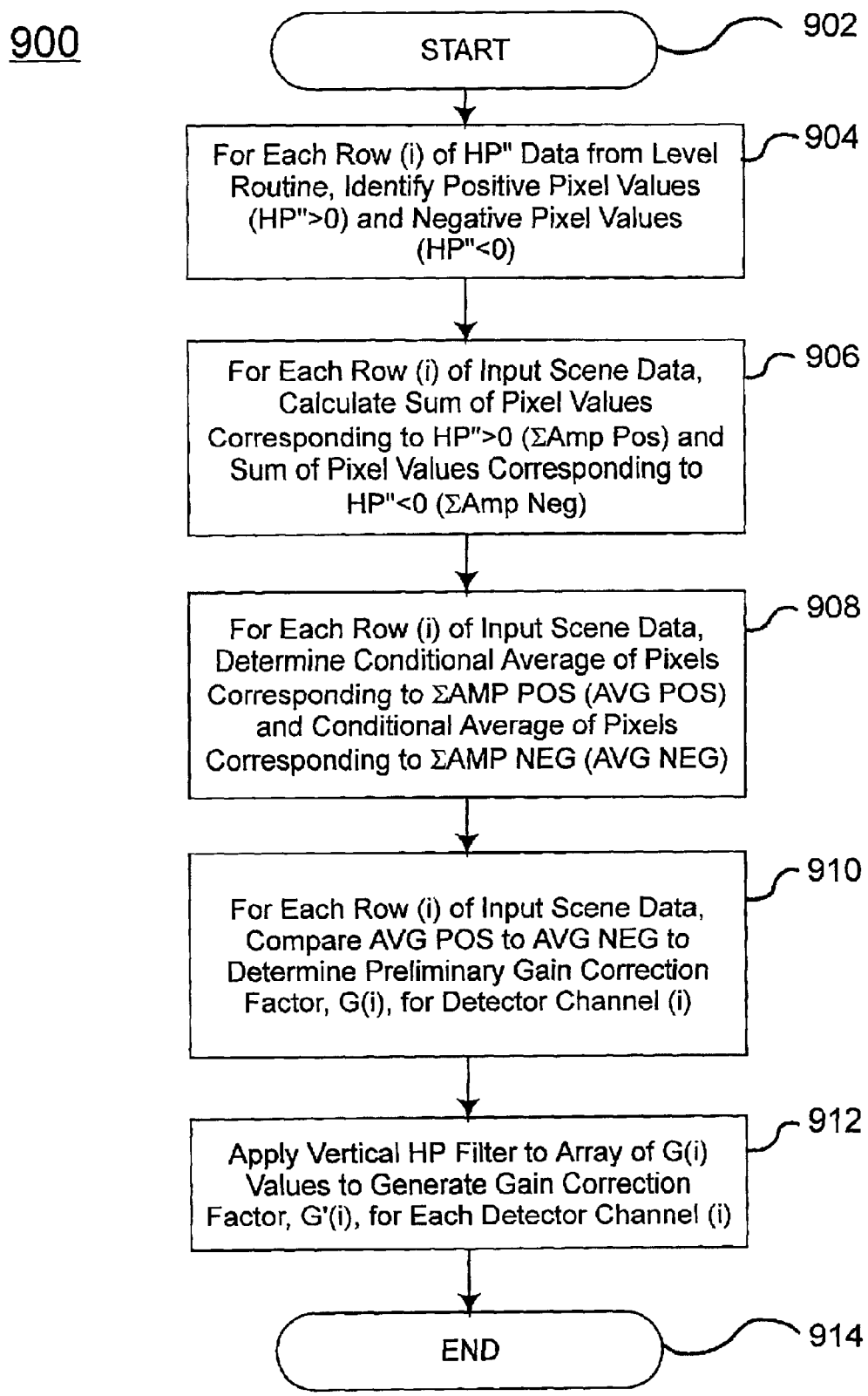
FIG. 9 is a block diagram illustrating a gain routine of a SBNUC routine according to an exemplary aspect of the present invention.
Figure 10:
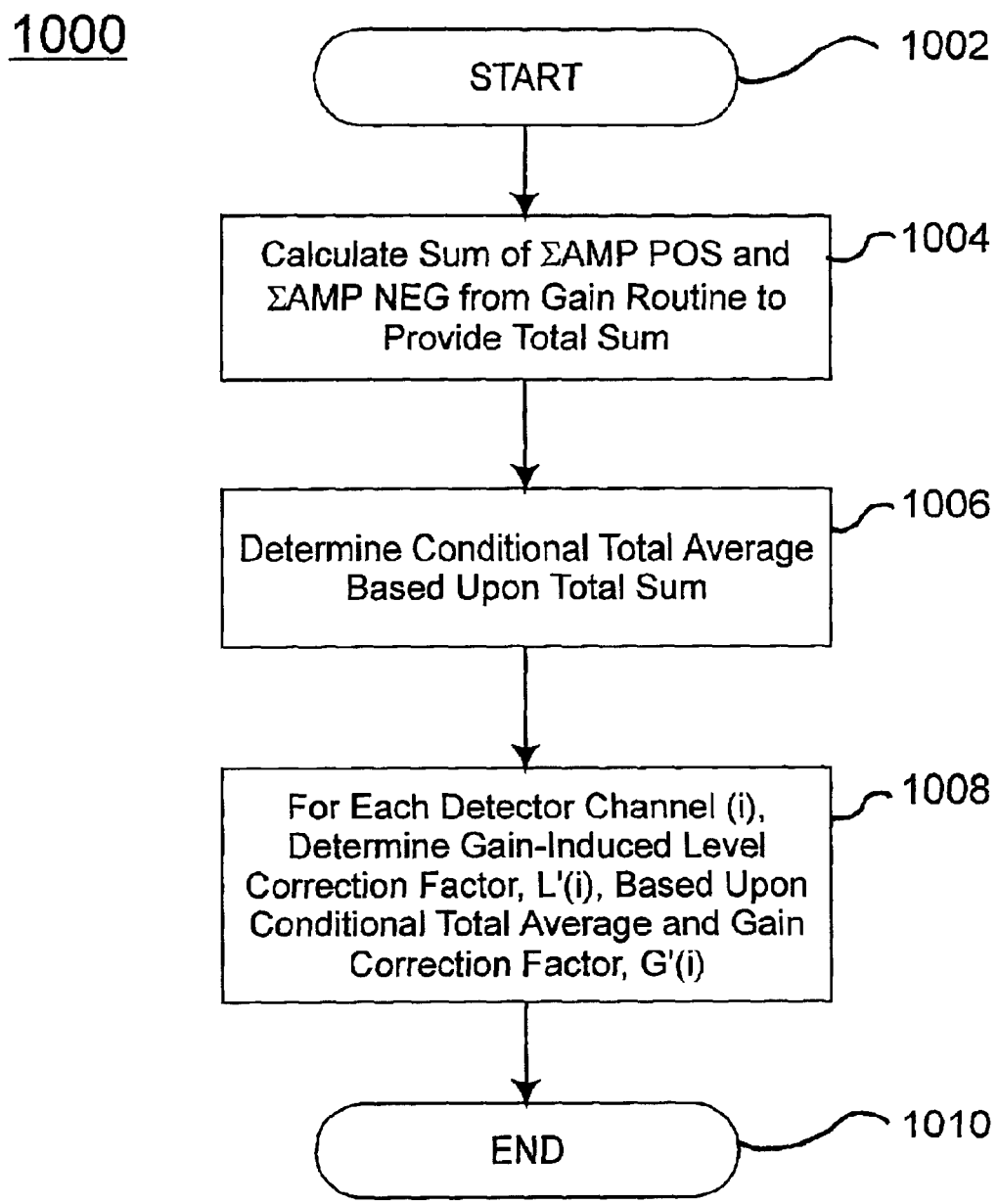
FIG. 10 is a block diagram illustrating a gain-induced level-correction routine of a SBNUC routine according to an exemplary aspect of the present invention.

An exemplary gain routine 900 pertaining to generating a gain correction factor for each detector channel consistent with the SBNUC routine 700 will now be described with reference to FIGS. 7 and 9. As indicated at block 714 of FIG. 7 and at step 904 of FIG. 9, HP" data from the null-pixel filter 708 can be directed to block 714 wherein for each row (i) of HP" data from the level routine 800 of the SBNUC routine 700, positive pixel values (HP">0) and negative pixel values (HP"<0) can be identified. If the null-pixel filter 708 is not utilized, a possibility noted above, then the HP' data from the threshold filter 706 can be directed to bock 714.

As illustrated in FIG. 7 and as noted at step 906, the HP">0 data, the HP"<0 data, and the frame of input scene data can be directed to block 716, wherein for each row (i) of the frame of input scene data, the sum of pixel values of the frame of input scene data corresponding to HP">0 (referred to as ΣAMP POS) and the sum of pixel values of the frame of input scene data corresponding to HP"<0 (referred to as ΣAMP NEG) can be calculated. It should be noted that the sums referred to here are sums of pixel values of the frame of input scene data, not sums of pixel values of the HP" data.

As indicated at step 908, the output data from block 716 can be directed to averaging block 718 wherein, for each row (i) of input scene data, an average referred to as AVG POS of the pixel values from the frame of input scene data corresponding to ΣAMP POS, and an average referred to as AVG NEG of the pixel values from the frame of input scene data corresponding to ΣAMP NEG can be calculated. The averaging can be conditional averaging such that AVG POS and AVG NEG are calculated if a number of non-zero pixels in a row of the HP" data is greater than a predetermined minimum number. If the number of non-zero pixels in a given row does not exceed the predetermined minimum number, the quantities AVG POS and AVG NEG can be given assigned values. The assigned values can be zero. In an exemplary aspect, the predetermined minimum number can range from approximately 0.25–0.8 times the number of pixels in a row of a frame of data. A predetermined minimum number of 0.6 times the number of pixels in a row has been found to be advantageous.

As indicated at step 910 the output data from block 718 can then be directed to block 720, wherein for each row of the frame of input scene data, the quantities AVG POS and AVG NEG can be compared to determine a gain correction factor for each detector channel (i). As indicated at block 720 and and step 910, the gain correction factors can be preliminary gain correction factors, G(i), which can subsequently undergo vertical high-pass filtering using high-pass filter HP3 represented by block 722, as indicated at step 912, to produce gain correction factors, G'(i). The high pass filter HP3 can be a damped high pass filter with a kernel (−⅓, +⅔, −⅓)*d3, where d3 is a damping factor. Generally, the damping factor d3 can range from approximately 0.5–1.0; d3=1.0 has been found to be advantageous.

Accordingly, with respect to a frame of input scene data, the gain routine 900 comprises applying high-pass filtering (e.g., block 702) and thresholding (e.g., block 706) to the frame of input scene data. The gain routine 900 further comprises, for each row of a frame of data generated from the previous step, identifying positive pixel values and negative pixel values (e.g., block 714). The gain routine 900 further comprises, for each row of the frame of input scene data, calculating a row average of the pixel values of the frame of input scene data corresponding to the positive pixel values (AVG POS), and calculating a row average of the pixel values of the frame of input scene data corresponding to the negative pixel values (AVG NEG) (e.g., blocks 716 and 718). Moreover, the gain routine 900 further comprises for each row of the frame of input scene data, comparing AVG POS to AVG NEG and determining a gain correction factor for each detector channel corresponding to each row of the frame of input scene data based upon the comparison of AVG POS to AVG NEG (e.g., block 720). The gain routine 900 can further comprise applying a vertical null-pixel filter prior to the step of identifying positive pixel values and negative pixel values (e.g., block 708), wherein the vertical null-pixel filter identifies null pixels of the frame of thresholded data having values of zero and assigns vertically adjacent pixels within a predetermined number of pixels of the null pixels to have values of zero.

An exemplary configuration for block 720 will now be described. In particular, block 720 can be configured such that a difference between AVG POS and AVG NEG can be calculated for each row (i) of the frame of input scene data, and a value can be assigned to each gain correction factor (or preliminary gain correction factor), G(i), based upon the following conditions:

if n2>(AVG POS)−(AVG NEG)>n1, then G(i)=1−Ginc/D;

if n2>(AVG NEG)−(AVG POS)>n1, then G(i)=1+Ginc/D;

if (AVG POS)−(AVG NEG)>n2, then G(i)=1−Ginc;

if (AVG NEG)−(AVG POS)>n2, then G(i)=1+Ginc;

if (AVG NEG)=0 or if (AVG POS)=0, then G(i)=1; and

G(i)=1 otherwise, wherein n2>n1, Ginc is a predetermined gain-correction step size, and D is a divisor factor greater than 1.

In the above, n1 and n2 can be predetermined quantities with units of photon counts and can provide an assessment of the significance of the difference between AVG POS and AVG NEG. In an exemplary aspect of the present invention, values of n1=50 counts (approximately) and n2=400 counts (approximately) have been found advantageous. More generally, n2 can be approximately 4–8 times greater than n1.

The above noted conditions pertaining to block 720 can provide for the determination of gain correction factors based on the consideration that AVG POS and AVG NEG corresponding to a given row of a frame of input scene data should be approximately equal when these quantities are calculated from scene data that has been corrected with properly adjusted values of the gain coefficients. The greater the difference between AVG POS and AVG NEG, the greater the adjustment required for the gain coefficients. Moreover, the direction in which a gain coefficient should be adjusted is dependent upon whether AVG POS is greater than AVG NEG or vice versa. This latter observation is also reflected in the construction of the conditions above. Accordingly, if the difference between AVG POS and AVG NEG is larger than n2, then the value of G(i) is adjusted in the appropriate direction as noted above using the full step size of Ginc. The value of Ginc can range from approximately 0.01–0.001. A value of 0.001 has been found to be advantageous. On the other hand, if the difference between AVG POS and AVG NEG is between n1 and n2, then the corresponding value of G(i) is adjusted in a smaller step-size increment of Ginc/D, where D is a divisor factor greater than 1. D can range from approximately 2–16; D=8 and D=10 have been found to be advantageous. In addition, if either AVG NEG or AVG POS is equal to zero then G(i) is set to 1. Moreover, if AVG POS=AVG NEG, then G(i) is set to 1 (this possibility is reflected in the condition "G(i)=1 otherwise"). If G(i)=1, it will be noted that no adjustment to the gain coefficient is made, given that an updated value of the gain coefficient, $b_i$, can be determined by multiplying an existing value of the gain coefficient by the gain correction factor, G(i), as noted above.

The gain routine 900 can be further understood by considering the following. Assuming a frame of scene data has been appropriately level corrected, an error between a given channel and its neighbors will be nearly zero at some temperatures and will have positive or negative error at other temperatures depending upon the gain of the detector channel relative to its neighbors. If the gain of a given detector channel is high relative to its neighbors, then the error is positive in hotter regions of scene imagery and negative in colder regions of scene imagery. Similarly, if the gain of a given detector channel is low relative to its neighbors, then the error is negative in hotter regions of scene imagery and positive in colder regions of scene imagery. Consequently, the gain algorithm examines the high-passed output of the SBNUC level threshold filter 706 and averages the raw scene data (amplitude) for pixels with positive error and compares that average to the average amplitude for pixels with negative error. If the average intensity of the positive error pixels is greater than the average intensity of the negative error pixels, then gain should be reduced for that channel. If the opposite is true, then gain should be increased for that channel. A dead band is provided in the SBNUC routine that provides for no change in gain if the average intensity for positive error is nearly the same as the average intensity for negative error. The resulting gain correction factors can be passed through a high-pass filter 722 to ensure that the above noted steps do not insert low frequency components or drift into the generated gain correction factors.

It should be noted that the above-described approach for determining gain correction factors according to block 720 can be applied iteratively as described above and provides for the determination of properly corrected values of the gain coefficients through successive adjustments. That is, values for the gain coefficients are repeatedly updated and converge to stable values as the SBNUC algorithm is repeated using successive frames of input scene data.

An exemplary gain-induced level correction routine 1000 pertaining to generating a gain-induced level correction factor for each detector channel consistent with the SBNUC routine 700 will now be described with reference to FIGS.

7 and 10. As indicated at step 1004 of FIG. 10 and at block 724 of FIG. 7, the output from block 716 of the gain routine described above wherein ΣAMP POS and ΣAMP NEG are determined can be directed to block 724 wherein the sum of ΣAMP POS and ΣAMP NEG can be calculated to provide a quantity referred to as Total Sum. As indicated as step 1006, the quantity Total Sum can then be directed to the averaging block 726 wherein a total average (TOT AVG) of pixel values of the frame of input scene data corresponding to ΣAMP POS and ΣAMP NEG can be calculated. In a manner similar to that noted previously, the average calculated at the averaging block 726 can be a conditional average, wherein the quantity TOT AVG is calculated if the total number of non-zero pixels of the frame of HP" data from the null-pixel filter is greater than a predetermined minimum number. TOT AVG is then calculated based upon the pixel values of the frame of input scene data corresponding to the non-zero pixels of the HP" data. If a null-pixel filter 708 is not utilized, the conditional average can be based upon an analysis of the non-zero pixels output from the threshold filter 706. If the number of non-zero pixels does not exceed the predetermined minimum number, the quantity TOT AVG can be given an assigned value. The assigned value can be zero. In an exemplary aspect, the predetermined minimum number can range from approximately 0.25–0.8 times the number of pixels in an entire frame of data. A predetermined minimum number of 0.6 times the number of pixels in a frame of data has been found to be advantageous.

As indicated at step 1008 and at block 728, the quantity TOT AVG and the gain correction factors, G(i), from the high-pass filter HP3 722 can then be directed to the gain-induced level correction block 728 wherein for each detector channel (i), a gain-induced level correction factor, L'(i), can be determined based upon the quantity TOT AVG and the gain correction factor, G'(i). In particular, the gain-induced level correction factor, L'(i), for each detector channel (i) can be given by the product (TOT AVG)×(1−G'(i)).

Accordingly, with respect to a frame of input scene data, it will be recognized that the routine for generating a gain-induced level correction factor comprises applying high-pass filtering (e.g., block 702) and thresholding (e.g., block 706) to the frame of input scene data to provide a frame of thresholded data. The routine further comprises, for a frame of data generated from the previous step, identifying positive pixel values and negative pixel values (e.g., block 714). Moreover, the routine comprises calculating a total average pixel value (TOT AVG) of pixels of the frame of input scene data corresponding to the positive pixel values and the negative pixel values noted above (e.g., blocks 716, 724 and 726). Further, the routine comprises calculating the gain-induced level correction factor for each detector channel based upon TOT AVG and the gain correction factor for each detector channel (e.g., block 728). Furthermore, the routine can comprise applying a vertical null-pixel filter to the frame of thresholded data prior to the step of identifying positive pixel values and negative pixel values (e.g., block 708), to generate a frame of null-pixel-filtered data, wherein the vertical null-pixel filter identifies null pixels of the frame of thresholded data having values of zero and assigns vertically adjacent pixels within a predetermined number of pixels of the null pixels to have values of zero.

Figure 11:
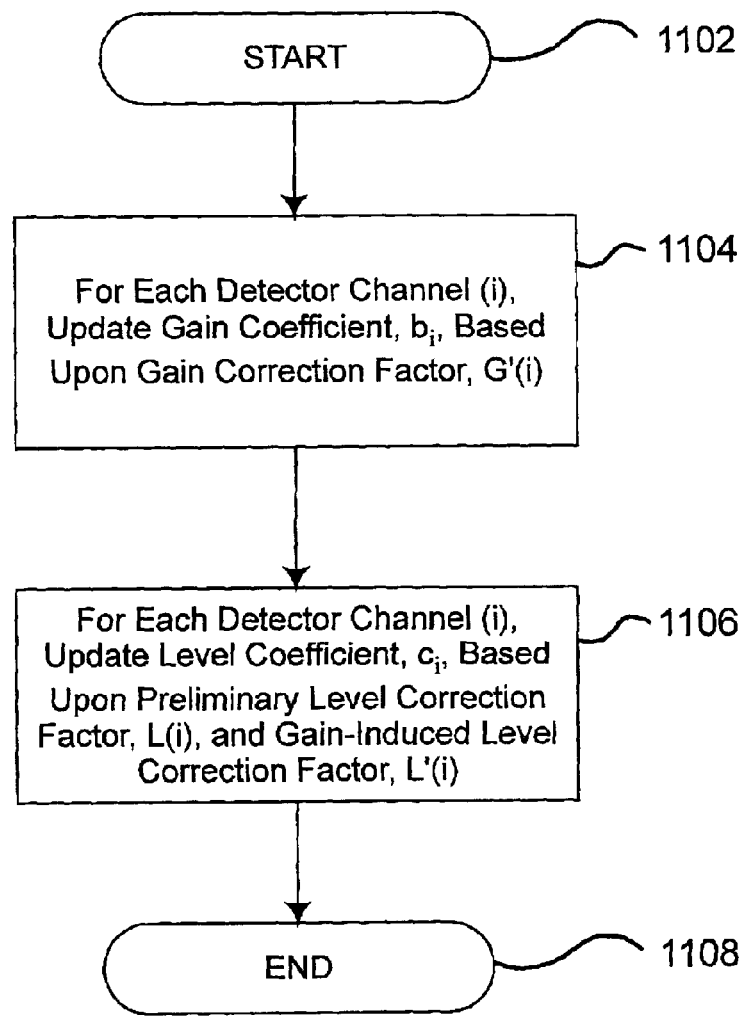
FIG. 11 is a block diagram illustrating an update routine of a SBNUC routine according to an exemplary aspect of the present invention.

An exemplary update routine 1100 pertaining to updating existing values of the gain and level coefficients for each detector channel consistent with the SBNUC routine 700 will now be described with reference to FIGS. 7 and 11. As indicated at step 1104, for each sensor channel (i), each gain coefficient $b_i$ can be updated based upon the associated gain correction factor, G'(i), output from block 722. In addition, as indicated at step 1106, for each detector channel (i), the level coefficient, $c_i$, can be updated based upon the preliminary level correction factor, L(i), output from block 712 and based upon the gain-induced level correction factor, L'(i), output from block 728. In an exemplary aspect of the present invention, the preliminary level correction factor and the gain-induced level correction factor for each detector channel (i) can be added, thereby forming a sum for each detector channel. This sum can then be subtracted from the existing value of the level coefficient, $c_i$, for each detector channel to form the updated value of the level coefficient. In addition, the existing value of the gain coefficient, $b_i$, for each channel can be multiplied by the gain correction factor, G'(i), corresponding to that channel to form the updated value of the gain coefficient, $b_i$, for each detector channel.

Figure 12:
FIG. 12 is an illustration of an actual original image taken with an infrared (IR) scanning detector array for processing using non-uniformity correction techniques according to an exemplary aspect of the present invention.
Figure 13:
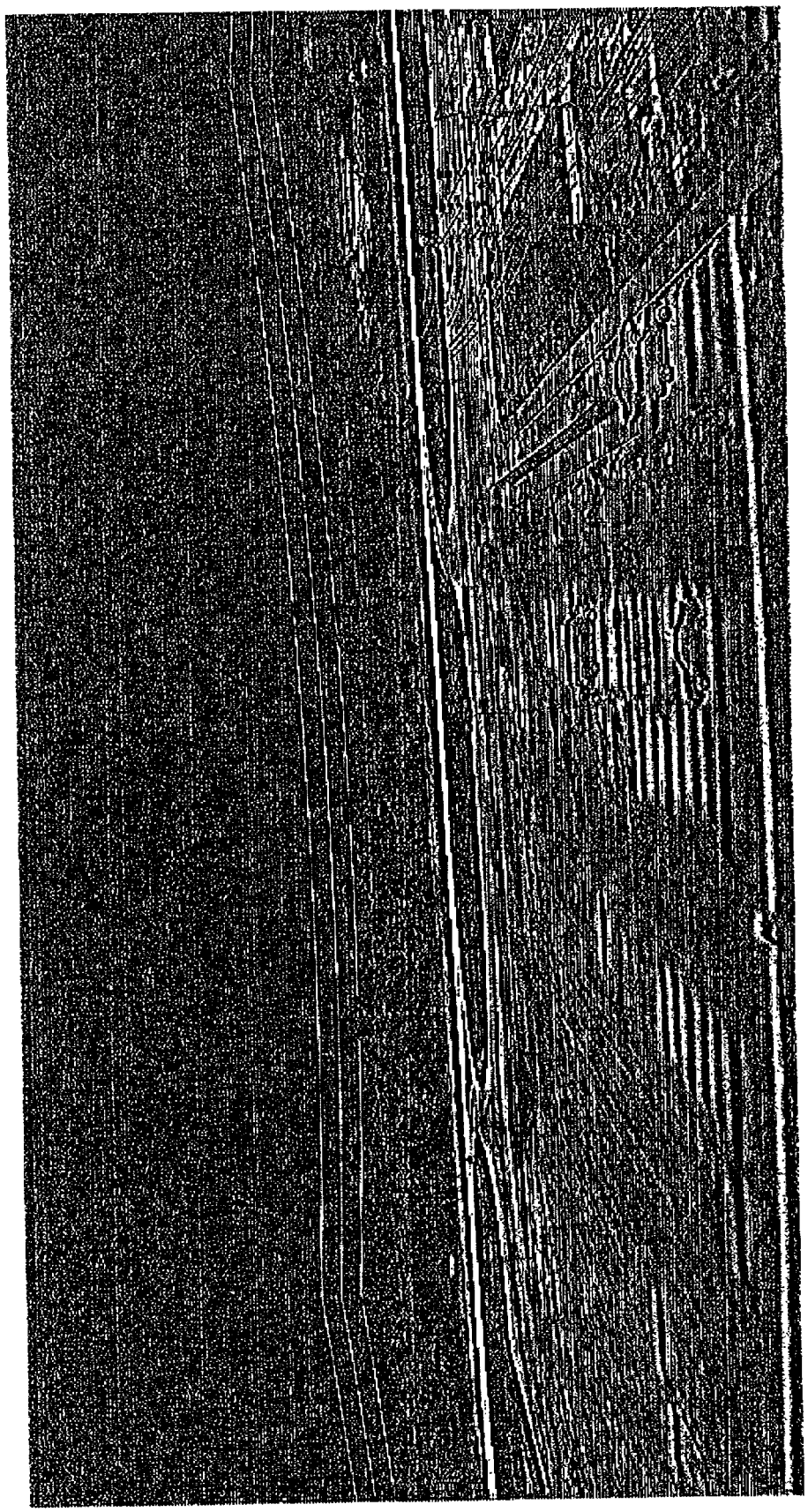
FIG. 13 is an illustration of a frame of high-passed data corresponding to the image illustrated in FIG. 12.
Figure 14:
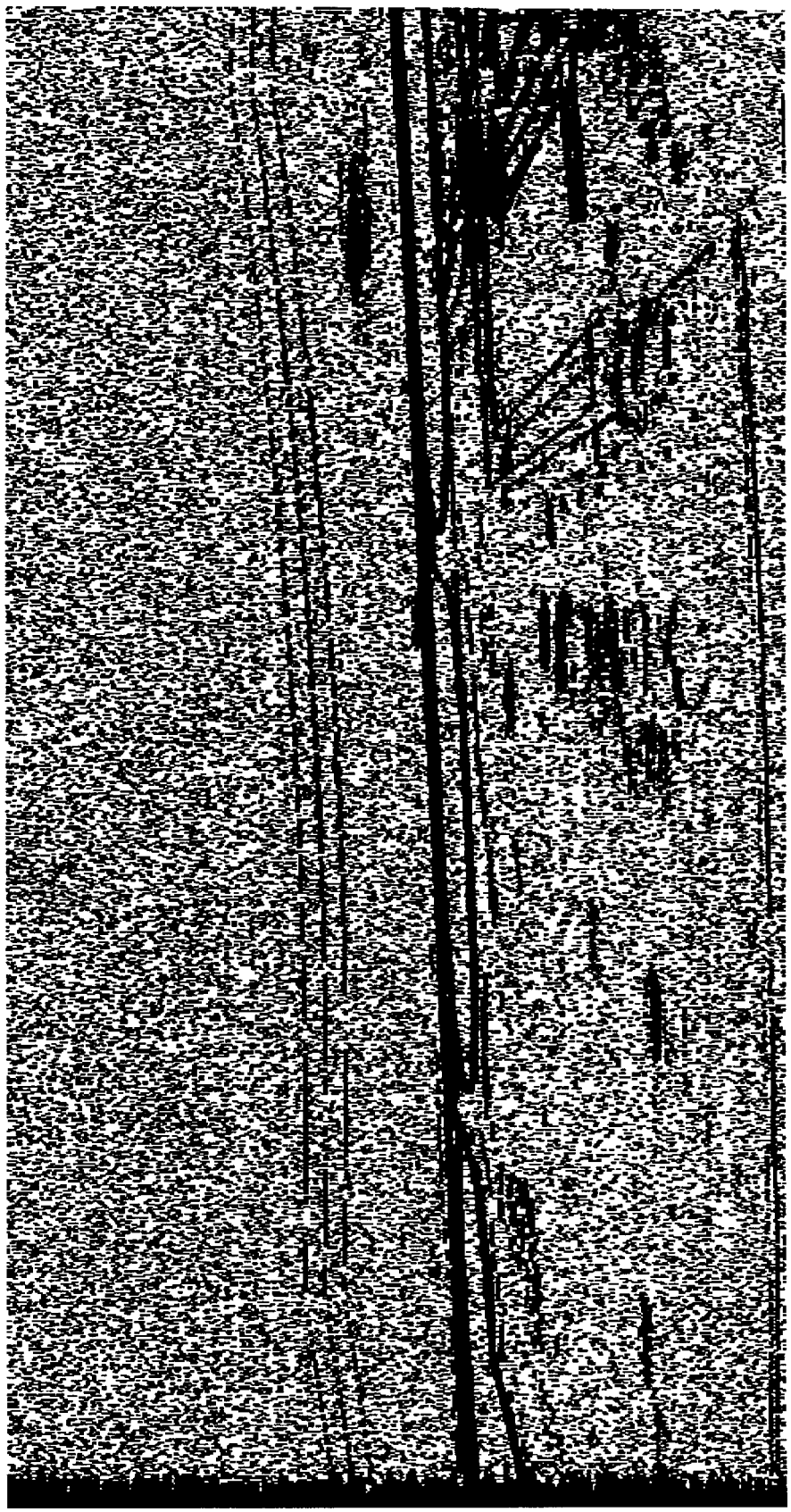
FIG. 14 is an illustration of the frame of high-passed data illustrated in FIG. 13 after thresholding according to an exemplary embodiment of the present invention.
Figure 15:
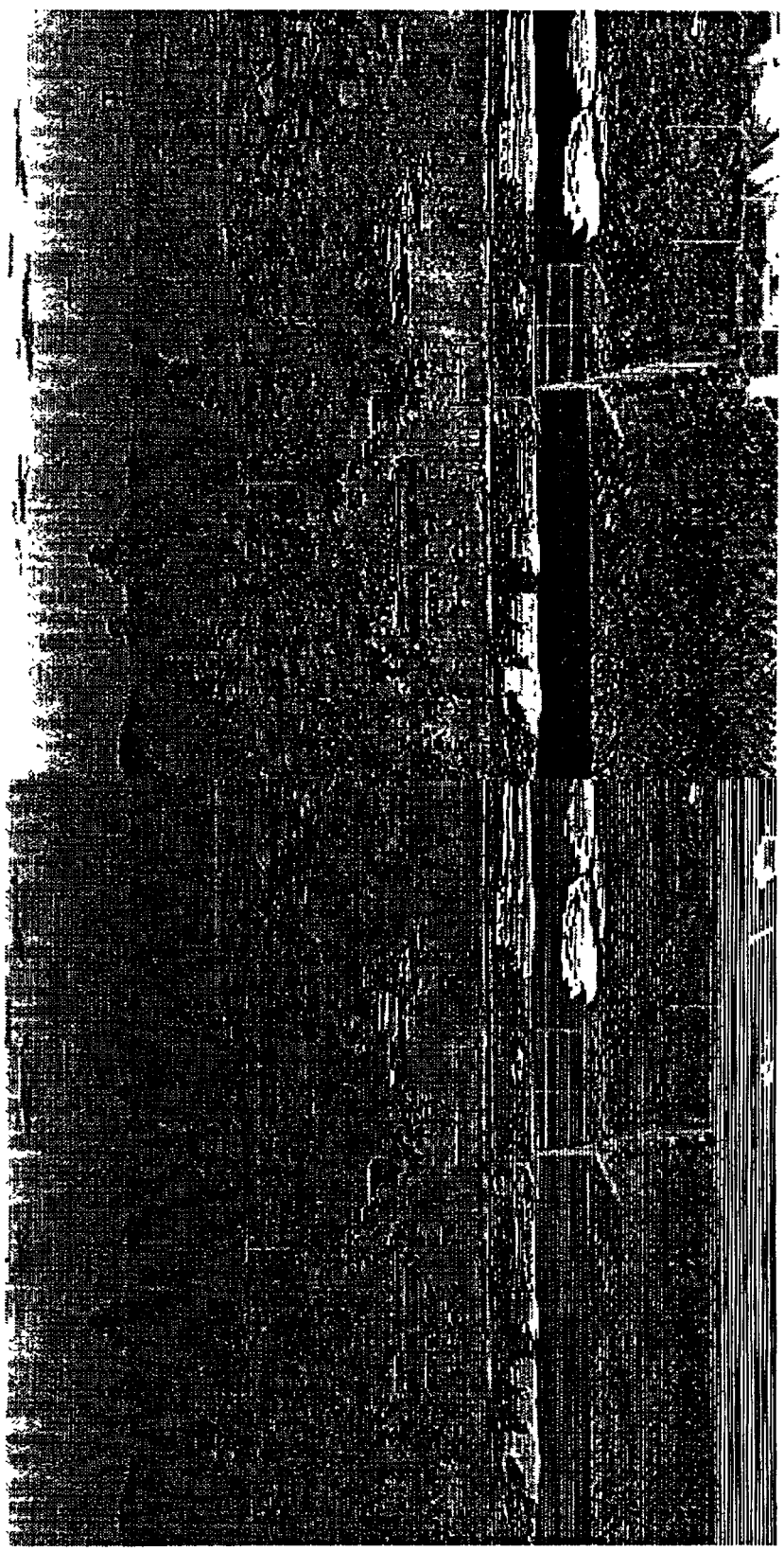
FIG. 15 is an illustration of an original image prior to non-uniformity correction (left) according to the present invention and a corresponding processed image following non-uniformity correction (right) according to an exemplary aspect of the present invention.

Exemplary images illustrating the techniques described herein can be seen in FIGS. 12–15. FIG. 12 is an illustration of an actual original scene image taken with an infrared (IR) scanning detector for processing using non-uniformity correction techniques described herein. FIG. 13 is an illustration of a frame of high-passed scene data (HP data) corresponding to the image in FIG. 12 that has been processed with high-pass filter (HP1) 702. It will be noted that areas of the original image in FIG. 12 with relatively flat contrast yield corresponding areas in the frame of HP data with pixel values of approximately zero. FIG. 14 is an illustration of the HP data illustrated in FIG. 13 after thresholding with the threshold filter 706 (the HP data prior to thresholding has also undergone application of the HIIR filter 704 as illustrated in FIG. 7). It should be noted in FIG. 14 that black pixels (with pixel values of zero) correspond to those pixels that have been identified by the threshold filter 706 as having scene-related content. These pixels are excluded from the determination of FPN associated with the scanning detector array 102. The vertical grouping of black pixels along the left edge of the thresholded image in FIG. 14 is an artifact related to the fact that the HIIR filter 704 must act upon a finite number of pixels to eliminate memorization of initial imagery conditions. FIG. 15 is an illustration of an original image prior to non-uniformity correction (left) according to the present invention and a corresponding processed image following non-uniformity correction (right) according to the techniques described herein. The image pair in FIG. 15 illustrates the utility of the present invention and reflects the benefits obtained by applying the SBNUC routine described herein on an image set for approximately 600 frames of input scene data. This image pair is indicative of the results that can occur in 10 seconds with a 60 Hertz scanning detector array 102.

It will be recognized that the present invention has certain advantages compared to conventional approaches. For example, the present invention is able to provide superior non-uniformity correction of imagery without requiring motion of a scene imagery relative to a scanning detector array (and, hence, without requiring complicated dithering mechanisms). In addition, the present invention does not require repeated blurring of scene imagery.

The invention has been described with reference to particular embodiments. However, it will be readily apparent to those skilled in the art that it is possible to embody the invention in specific forms other than those of the embodiments described above. This can be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of providing corrected values of gain and level coefficients of a set of correction coefficients for a scanning detector array, the scanning detector array comprising a plurality of detector channels, the method comprising the steps of:

modifying first values of the gain and level coefficients using at least one frame of image data collected by the scanning detector array from out-of-focus multiple-temperature imagery; and determining updated values of the gain and level coefficients using a scene-based non-uniformity correction (SBNUC) routine applied to scene data corresponding to focused scene imagery.

2. The method of claim 1, wherein the step of modifying first values of the gain and level coefficients comprises applying said SBNUC routine to the frame of image data collected from out-of-focus multiple temperature imagery.

3. The method of claim 1, wherein said step of determining updated values of the gain and level coefficients using the SBNUC routine comprises the steps of:

acquiring a frame of said scene data corresponding to focused scene imagery;

applying a response correction to the frame of scene data using existing values of the gain and level coefficients to provide a corrected frame of scene data; and adjusting the existing values of the gain and level coefficients using the SBNUC routine applied to the corrected frame of scene data, wherein the existing values of the gain and level coefficients are replaced with updated values.

4. The method of claim 3, wherein said step of adjusting the existing values of the gain and level coefficients is carried out while displaying a corrected scene image corresponding to the corrected frame of scene data.

5. The method of claim 3, wherein the set of correction coefficients includes moment coefficients, and wherein said step of applying a response correction to the frame of scene data includes using the moment coefficients.

6. The method of claim 3, wherein the step of adjusting the existing values of the gain and level coefficients using the SBNUC routine comprises the steps of:

generating a preliminary level correction factor for each detector channel using a frame of scene data;

generating a gain correction factor for each detector channel using the frame of scene data;

generating a gain-induced level correction factor for each detector channel based upon the gain correction factor; and updating the existing values of the gain and level coefficients for each detector channel using the preliminary level correction factor, the gain-induced level correction factor, and the gain correction factor for each channel.

7. The method of claim 6, wherein the step of updating the existing values of the gain and level coefficients comprises:

adding the preliminary level correction factor and the gain-induced level correction factor for each channel, thereby forming a sum corresponding to each detector channel;

subtracting the sum from the existing value of the level coefficient for each detector channel to form the updated value of said level coefficient; and multiplying the existing value of the gain coefficient for each channel by the gain correction factor corresponding to that channel to form the updated value of the gain coefficient for each detector channel.

8. The method of claim 3, wherein said steps of acquiring a frame of scene data, applying a response correction, and adjusting the existing values of the gain and level coefficients are carried out sequentially in that order.

9. The method of claim 8, wherein said steps of acquiring a frame of scene data, applying a response correction, and adjusting the existing values of the gain and level coefficients are repeated iteratively such that the updated values of the gain and level coefficients converge to respective stable values.

10. The method of claim 1, further comprising:

adjusting initial values of the level coefficients of the set of correction coefficients using an initial frame of image data collected by the scanning detector array from a predetermined source, said adjusting providing the first values of the level coefficients.

11. The method of claim 10, wherein the predetermined source is a bland source having a substantially uniform spatial structure and a substantially uniform temperature.

12. A scene-based non-uniformity correction (SBNUC) method for correcting values of gain and level coefficients of a set of correction coefficients for a scanning detector array, the scanning detector array comprising a plurality of detector channels, the method comprising the steps of:

generating a preliminary level correction factor for each detector channel using a frame of input scene data;

generating a gain correction factor for each detector channel using the frame of input scene data;

generating a gain-induced level correction factor for each detector channel based upon the gain correction factor; and updating existing values of the gain and level coefficients for each detector channel using the preliminary level correction factor, the gain-induced level correction factor, and the gain correction factor for each detector channel.

13. The method of claim 12, wherein the steps of generating a preliminary level correction factor for each detector channel, generating a gain correction factor for each detector channel, generating a gain-induced level correction factor for each detector channel, and updating existing values of the gain and level coefficients are repeated iteratively using successive frames of input scene data such that updated values of the gain and level coefficients converge to respective stable values.

14. The method of claim 12, wherein the step of updating the existing values of the gain and level coefficients comprises:

adding the preliminary level correction factor and the gain-induced level correction factor for each channel, thereby forming a sum corresponding to each detector channel;

subtracting the sum from the existing value of the level coefficient for each detector channel to form an updated value of said level coefficient; and multiplying the existing value of the gain coefficient for each channel by the gain correction factor corresponding to that channel to form an updated value of the gain coefficient for each detector channel.

15. The method of claim 12, wherein the step of generating a preliminary level correction factor for each channel comprises:

applying a first vertical high pass filter to the frame of input scene data to generate a frame of first high-passed data;

applying a horizontal infinite impulse response filter to the frame of first high-passed data to generate a frame of second high-passed data;

applying thresholding based upon the frame of first high-passed data and the frame of second high-passed data to generate a frame of thresholded data; and averaging the values of pixels in each row of a frame of data generated from the previous step to generate row averages to provide preliminary level correction factors.

16. The method of claim 15, further comprising the step of:

applying a second vertical high pass filter to the row averages to generate high-passed row averages, the high-passed row averages being used as the preliminary level correction factors.

17. The method of claim 15, further comprising the step of:

applying a vertical null-pixel filter to the frame of thresholded data prior to said averaging step to generate a frame of null-pixel-filtered data, wherein the vertical null-pixel filter identifies null pixels of the frame of thresholded data having values of zero and assigns vertically adjacent pixels within a predetermined number of pixels of the null pixels to have values of zero.

18. The method of claim 17, wherein the predetermined number of pixels is one.

19. The method of claim 15, wherein the first vertical high pass filter has a kernel of $d1 \times (-\frac{1}{3}, \frac{2}{3}, -\frac{1}{3})$ and wherein the second high pass filter has a kernel of $d2 \times (-\frac{1}{3}, \frac{2}{3}, -\frac{1}{3})$, where d1 and d2 are damping factors.

20. The method of claim 19, wherein d1 is in the range of approximately 0.5–0.95 and wherein d2 is approximately 1.0.

21. The method of claim 15, wherein the averaging is conditional averaging such that a row average is calculated if a number of non-zero pixels in that row is greater than a predetermined minimum number, the row average being calculated based upon the number of non-zero pixels, and wherein the row average is given an assigned value otherwise.

22. The method of claim 21, wherein the predetermined minimum number is in the range of approximately 0.25–0.8 times a number of pixels in each row.

23. The method of claim 21, wherein the assigned value is zero.

24. The method of claim 15, wherein said thresholding comprises the steps of:

for each pixel of the frame of first high-passed data, making a first determination of whether an absolute value of said pixel value of the frame of first high-passed data is greater than zero and less than a first threshold value, and making a second determination of whether an absolute value of a difference between said pixel value of the frame of first high-passed data and a pixel value of a corresponding pixel of the frame of second high-passed data is less than a second threshold value;

assigning a corresponding pixel value of the frame of thresholded data to have said pixel value of the frame of first high-passed data if both the first and second determinations are true; and giving the corresponding pixel value an assigned value otherwise.

25. The method of claim 24, wherein assigned value is zero.

26. The method of claim 24, wherein the first threshold value is in the range of approximately 1–1.5 times a temporal noise value.

27. The method of claim 26, wherein the second threshold value is in the range of approximately 3–4 times the temporal noise value.

28. The method of claim 12, wherein the step of generating a gain correction factor for each detector channel comprises the steps of:

applying high-pass filtering and thresholding to the frame of input scene data;

for each row of a frame of data generated from the previous step, identifying positive pixel values and negative pixel values;

for each row of the frame of input scene data, calculating a row average of the pixel values of the frame of input scene data corresponding to the positive pixel values (AVG POS), and calculating a row average of the pixel values of the frame of input scene data corresponding to the negative pixel values (AVG NEG);

for each row of the frame of input scene data, comparing AVG POS to AVG NEG; and determining a gain correction factor for each detector channel corresponding to each row of the frame of input scene data based upon said comparing AVG POS to AVG NEG.

29. The method of claim 28, further comprising the step of:

applying a vertical null-pixel filter prior to said step of identifying positive pixel values and negative pixel values, wherein the vertical null-pixel filter identifies null pixels of the frame of thresholded data having values of zero and assigns vertically adjacent pixels within a predetermined number of pixels of the null pixels to have values of zero.

30. The method of claim 29, wherein the predetermined number of pixels is one.

31. The method of claim 26, wherein calculating a row average is conditional such that he row average is calculated if a number of non-zero pixels in that row is greater than a predetermined minimum number, the row average being calculated based upon the number of non-zero pixels, and wherein the row average is given an assigned value otherwise.

32. The method of claim 31, wherein the predetermined minimum number is in the range of approximately 0.25–0.8 times a number of pixels in each row.

33. The method of claim 31, wherein the assigned value is zero.

34. The method of claim 28, wherein said gain correction factors are preliminary gain correction factors and wherein the method further comprises the step of:

applying a high-pass filter to the array of preliminary gain correction factors.

35. The method of claim 34, wherein the high pass filter has a kernel of $d \times (-\frac{1}{3}, \frac{2}{3}, -\frac{1}{3})$, wherein d is a damping factor.

36. The method of claim 28, wherein said step of comparing and said step of determining together comprise the steps of:

calculating a difference between AVG POS and AVG NEG for each row (i) of the frame of input scene data; and assigning a value to each gain correction factor, G(i), based upon the following conditions:

if n2>(AVG POS)–(AVG NEG)>n1, then G(i)=1–Ginc/D;

if n2>(AVG NEG)–(AVG POS)>n1, then G(i)=1+Ginc/D;

if (AVG POS)–(AVG NEG)>n2, then G(i)=1–Ginc;

if (AVG NEG)–(AVG POS)>n2, then G(i)=1+Ginc;

if (AVG NEG)=0 or if (AVG POS)=0, then G(i)=1; and

G(i)=1 otherwise, wherein n2>n1, Ginc is a predetermined gain-correction step size, and D is a divisor factor greater than 1.

37. The method of claim 36, wherein n2 is approximately 4–8 times greater than n1.

38. The method of claim 36, wherein Ginc is in the range of approximately 0.01–0.001 and wherein D is in the range of approximately 2–16.

39. The method of claim 36, wherein said gain correction factors, G(i), are preliminary gain correction factors and wherein the method further comprises the step of:

applying a high pass filter to the array of preliminary gain correction factors, G(i), to generate the gain correction factors, G'(i), for the detector channels of the scanning detector array.

40. The method of claim 12, wherein said step of generating a gain-induced level correction factor for each detector channel comprises the steps of:

applying high-pass filtering and thresholding to the frame of input scene data to provide a frame of thresholded data;

for a frame of data generated from the previous step, identifying positive pixel values and negative pixel values;

calculating a total average pixel value (TOT AVG) of pixels of the frame of input scene data corresponding to said positive pixel values and said negative pixel values; and calculating the gain-induced level correction factor for each detector channel based upon TOT AVG and the gain correction factor for each detector channel.

41. The method of claim 40, wherein the gain-induced level correction factor for each detector channel is equal to the product (TOT AVG)×(1–gain correction factor for each detector channel).

42. The method of claim 40, further comprising the step of:

applying a vertical null-pixel filter to the frame of thresholded data prior to said step of identifying positive pixel values and negative pixel values, to generate a frame of null-pixel-filtered data, wherein the vertical null-pixel filter identifies null pixels of the frame of thresholded data having values of zero and assigns vertically adjacent pixels within a predetermined number of pixels of the null pixels to have values of zero.

43. The method of claim 42, wherein the predetermined number of pixels is one.

44. An apparatus for providing corrected values of gain and level coefficients of a set of correction coefficients for a scanning detector array, comprising:

a processor unit coupled to a scanning detector array, the processor unit being configured to:

modify first values of the gain and level coefficients using at least one frame of image data collected from out-of-focus multiple-temperature imagery by the scanning detector array; and determine updated values of the gain and level coefficients using a scene-based non-uniformity correction (SBNUC) routine applied to scene data corresponding to focused scene imagery.

45. An apparatus for providing corrected values of gain and level coefficients of a set of correction coefficients for a scanning detector array, comprising:

a processor unit coupled to a scanning detector array, the processor unit being configured to:

generate a preliminary level correction factor for each detector channel using a frame of input scene data;

generate a gain correction factor for each detector channel using the frame of input scene data;

generate a gain-induced level correction factor for each detector channel based upon the gain correction factor; and update existing values of the gain and level coefficients for each detector channel using the preliminary level correction factor, the gain-induced level correction factor, and the gain correction factor for each channel.

46. The apparatus of claim 44, wherein the processor unit is configured to modify first values of the gain and level coefficients by applying said SBNUC routine to the frame of image data collected from out-of-focus multiple temperature imagery.

47. The apparatus of claim 44, wherein the processor unit is configured to determine updated values of the gain and level coefficients by:

acquiring a frame of said scene data corresponding to focused scene imagery;

applying a response correction to the frame of scene data using existing values of the gain and level coefficients to provide a corrected frame of scene data; and adjusting the existing values of the gain and level coefficients using the SBNUC routine applied to the corrected frame of scene data, wherein the existing values of the gain and level coefficients are replaced with updated values.

48. The apparatus of claim 47, wherein the set of correction coefficients includes moment coefficients, and wherein the processor unit is configured to apply the response correction to the frame of scene data using the moment coefficients.

49. The apparatus of claim 45, wherein the processor unit is configured to generate a preliminary level correction factor for each detector channel, generate a gain correction factor for each detector channel, generate a gain-induced level correction factor for each detector channel, and update existing values of the gain and level coefficients iteratively using successive frames of input scene data such that updated values of the gain and level coefficients converge to respective stable values.

50. The apparatus of claim 45, wherein the processor unit is configure to update existing values of the gain and level coefficients by:

adding the preliminary level correction factor and the gain-induced level correction factor for each channel, thereby forming a sum corresponding to each detector channel;

subtracting the sum from the existing value of the level coefficient for each detector channel to form an updated value of said level coefficient; and multiplying the existing value of the gain coefficient for each channel by the gain correction factor corresponding to that channel to form an updated value of the gain coefficient for each detector channel.

51. The apparatus of claim 45, wherein the processor unit is configured to generate a preliminary level correction factor for each channel by:

applying a first vertical high pass filter to the frame of input scene data to generate a frame of first high-passed data;

applying a horizontal infinite impulse response filter to the frame of first high-passed data to generate a frame of second high-passed data;

applying thresholding based upon the frame of first high-passed data and the frame of second high-passed data to generate a frame of thresholded data; and averaging the values of pixels in each row of a frame of data generated from the previous step to generate row averages to provide preliminary level correction factors.

52. The apparatus of claim 51, wherein the processor unit is configured to apply a second vertical high pass filter to the row averages to generate high-passed row averages, the high-passed row averages being used as the preliminary level correction factors.

53. The apparatus of claim 51, wherein the processor unit is configured to apply a vertical null-pixel filter to the frame of thresholded data prior to said averaging step to generate a frame of null-pixel-filtered data, wherein the vertical null-pixel filter identifies null pixels of the frame of thresholded data having values of zero and assigns vertically adjacent pixels within a predetermined number of pixels of the null pixels to have values of zero.

54. The apparatus of claim 51, wherein said thresholding comprises:

for each pixel of the frame of first high-passed data, making a first determination of whether an absolute value of said pixel value of the frame of first high-passed data is greater than zero and less than a first threshold value, and making a second determination of whether an absolute value of a difference between said pixel value of the frame of first high-passed data and a pixel value of a corresponding pixel of the frame of second high-passed data is less than a second threshold value;

assigning a corresponding pixel value of the frame of thresholded data to have said pixel value of the frame of first high-passed data if both the first and second determinations are true; and giving the corresponding pixel value an assigned value otherwise.

55. The apparatus of claim 45, wherein the processor unit is configured to generate a gain correction factor for each detector channel by:

applying high-pass filtering and thresholding to the frame of input scene data;

for each row of a frame of data generated from the previous step, identifying positive pixel values and negative pixel values;

for each row of the frame of input scene data, calculating a row average of the pixel values of the frame of input scene data corresponding to the positive pixel values (AVG POS), and calculating a row average of the pixel values of the frame of input scene data corresponding to the negative pixel values (AVG NEG);

for each row of the frame of input scene data, comparing AVG POS to AVG NEG; and determining a gain correction factor for each detector channel corresponding to each row of the frame of input scene data based upon said comparing AVG POS to AVG NEG.

56. The apparatus of claim 55, wherein said gain correction factors are preliminary gain correction factors and wherein the processor unit is configured to apply a high-pass filter to the array of preliminary gain correction factors.

57. The apparatus of claim 55, wherein said comparing and said determining together comprise:

calculating a difference between AVG POS and AVG NEG for each row (i) of the frame of input scene data; and assigning a value to each gain correction factor, G(i), based upon the following conditions:

if n2>(AVG POS)−(AVG NEG)>n1, then G(i)=1−Ginc/D;

if n2>(AVG NEG)−(AVG POS)>n1, then G(i)=1+Ginc/D;

if (AVG POS)−(AVG NEG)>n2, then G(i)=1−Ginc;

if (AVG NEG)−(AVG POS)>n2, then G(i)=1+Ginc;

if (AVG NEG)=0 or if (AVG POS)=0, then G(i)=1; and

G(i)=1 otherwise, wherein n2>n1, Ginc is a predetermined gain-correction step size, and D is a divisor factor greater than 1.

58. The apparatus of claim 45, wherein the processor unit is configured to generate a gain-induced level correction factor for each detector channel by:

applying high-pass filtering and thresholding to the frame of input scene data to provide a frame of thresholded data;

for a frame of data generated from the previous step, identifying positive pixel values and negative pixel values;

calculating a total average pixel value (TOT AVG) of pixels of the frame of input scene data corresponding to said positive pixel values and said negative pixel values; and calculating the gain-induced level correction factor for each detector channel based upon TOT AVG and the gain correction factor for each detector channel.

59. The apparatus of claim 58, wherein the gain-induced level correction factor for each detector channel is equal to the product (TOT AVG)×(1−gain correction factor for each detector channel).

60. A computer-readable carrier having a set of executable instructions embodied therein adapted to cause a processor unit to execute the method according to claim 1.

61. A computer-readable carrier having a set of executable instructions embodied therein adapted to cause a processor unit to execute the method according to claim 2.

62. A computer-readable carrier having a set of executable instructions embodied therein adapted to cause a processor unit to execute the method according to claim 3.

63. A computer-readable carrier having a set of executable instructions embodied therein adapted to cause a processor unit to execute the method according to claim 5.

64. A computer-readable carrier having a set of executable instructions embodied therein adapted to cause a processor unit to execute the method according to claim 12.

65. A computer-readable carrier having a set of executable instructions embodied therein adapted to cause a processor unit to execute the method according to claim 13.

66. A computer-readable carrier having a set of executable instructions embodied therein adapted to cause a processor unit to execute the method according to claim 14.

67. A computer-readable carrier having a set of executable instructions embodied therein adapted to cause a processor unit to execute the method according to claim 15.

68. A computer-readable carrier having a set of executable instructions embodied therein adapted to cause a processor unit to execute the method according to claim 16.

69. A computer-readable carrier having a set of executable instructions embodied therein adapted to cause a processor unit to execute the method according to claim 17.

70. A computer-readable carrier having a set of executable instructions embodied therein adapted to cause a processor unit to execute the method according to claim 24.

71. A computer-readable carrier having a set of executable instructions embodied therein adapted to cause a processor unit to execute the method according to claim 28.

72. A computer-readable carrier having a set of executable instructions embodied therein adapted to cause a processor unit to execute the method according to claim 34.

73. A computer-readable carrier having a set of executable instructions embodied therein adapted to cause a processor unit to execute the method according to claim 36.

74. A computer-readable carrier having a set of executable instructions embodied therein adapted to cause a processor unit to execute the method according to claim 40.

75. A computer-readable carrier having a set of executable instructions embodied therein adapted to cause a processor unit to execute the method according to claim 41.

* * * * *

UNITED STATES PATENT AND TRADEMARK OFFICE
CERTIFICATE OF CORRECTION

PATENT NO. : 6,901,173 B2
DATED : May 31, 2005
INVENTOR(S) : Timothy Alderson et al.

It is certified that error appears in the above-identified patent and that said Letters Patent is hereby corrected as shown below:

Column 22,
Line 41, "that he row average" should read -- that the row average --; and Column 24,
Line 52, "is configure to update" should read -- is configured to update --.

Signed and Sealed this

Sixth Day of September, 2005

JON W. DUDAS
*Director of the United States Patent and Trademark Office*